United States Patent
Nishii

(10) Patent No.: US 10,824,381 B2
(45) Date of Patent: *Nov. 3, 2020

(54) IMAGE FORMING APPARATUS FORMING IMAGES BASED ON RECEIVED IMAGE DATA, TERMINAL DEVICE TRANSMITTING IMAGE DATA TO THE IMAGE FORMING APPARATUS, IMAGE FORMING SYSTEM INCLUDING IMAGE FORMING APPARATUS AND TERMINAL DEVICE, AND NON-TRANSITORY COMPUTER READABLE MEDIUM

(71) Applicant: Sharp Kabushiki Kaisha, Sakai, Osaka (JP)

(72) Inventor: Yasuto Nishii, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,709

(22) Filed: Aug. 1, 2019

(65) Prior Publication Data

US 2019/0354327 A1    Nov. 21, 2019

Related U.S. Application Data

(63) Continuation of application No. 16/168,880, filed on Oct. 24, 2018, now Pat. No. 10,416,938, which is a (Continued)

(30) Foreign Application Priority Data

Oct. 9, 2012    (JP) ................. 2012-223812

(51) Int. Cl.
*G06F 3/12* (2006.01)
*H04N 1/00* (2006.01)
*H04N 1/32* (2006.01)

(52) U.S. Cl.
CPC .......... *G06F 3/1236* (2013.01); *G06F 3/1212* (2013.01); *G06F 3/1267* (2013.01);
(Continued)

(58) Field of Classification Search
None
See application file for complete search history.

(56) References Cited

U.S. PATENT DOCUMENTS 8,902,445 B2 * 12/2014 Yoshida ............ H04N 1/00347
358/1.13
9,830,117 B2 * 11/2017 Nishii ................... G06F 3/1236
(Continued)

FOREIGN PATENT DOCUMENTS

| CN | 101630964 A | 1/2010 |
| JP | 2006-173947 A | 6/2006 |
| JP | 2011-066561 A | 3/2011 |

OTHER PUBLICATIONS

Nishii, "Image Forming Apparatus Forming Images Based on Received Image Data, Terminal Device Transmitting Image Data to the Image Forming Apparatus, Image Forming System Including Image Forming Apparatus and Terminal Device, and Non-Transitory Computer Readable Medium", U.S. Appl. No. 16/168,880, filed Oct. 24, 2018.

*Primary Examiner* — Miya J Williams
(74) *Attorney, Agent, or Firm* — Keating & Bennett, LLP

(57) ABSTRACT

A multifunction peripheral (100) is connected to a terminal device (200) via a communication link, receives image data transmitted from the terminal device (200) and forms an image based on the image data. Further, the multifunction peripheral (100) detects the state of connection of the communication link and thereby detects whether or not communication with the terminal device (200) is interrupted. If interruption of communication is detected while image data transmitted from the terminal device is being
(Continued)

received, the multifunction peripheral suspends the unfinished state of reception of image data.

17 Claims, 20 Drawing Sheets

Related U.S. Application Data continuation of application No. 15/783,142, filed on Oct. 13, 2017, now Pat. No. 10,146,489, which is a continuation of application No. 14/428,472, filed as application No. PCT/JP2013/077093 on Oct. 4, 2013, now Pat. No. 9,830,117.

(52) U.S. Cl.
CPC ....... *G06F 3/1292* (2013.01); *H04N 1/00307* (2013.01); *H04N 1/00915* (2013.01); *H04N 1/32641* (2013.01); *H04N 2201/0036* (2013.01); *H04N 2201/0094* (2013.01)

(56) References Cited

U.S. PATENT DOCUMENTS

| | | | |
|---|---|---|---|
| 10,146,489 B2 * | 12/2018 | Nishii | G06F 3/1236 |
| 10,416,938 B2 * | 9/2019 | Nishii | H04N 1/00915 |
| 2007/0179752 A1 * | 8/2007 | Tonouchi | G06F 21/606 |
| | | | 702/188 |
| 2009/0116054 A1 * | 5/2009 | Mitsudomi | H04W 76/18 |
| | | | 358/1.15 |
| 2009/0316206 A1 * | 12/2009 | Anezaki | G06F 3/1204 |
| | | | 358/1.15 |
| 2010/0014118 A1 | 1/2010 | Yamano | |
| 2010/0020355 A1 * | 1/2010 | Imai | G06F 21/608 |
| | | | 358/1.15 |
| 2011/0217933 A1 * | 9/2011 | Nagoshi | H04N 5/782 |
| | | | 455/41.3 |

\* cited by examiner

IMAGE FORMING APPARATUS FORMING IMAGES BASED ON RECEIVED IMAGE DATA, TERMINAL DEVICE TRANSMITTING IMAGE DATA TO THE IMAGE FORMING APPARATUS, IMAGE FORMING SYSTEM INCLUDING IMAGE FORMING APPARATUS AND TERMINAL DEVICE, AND NON-TRANSITORY COMPUTER READABLE MEDIUM

TECHNICAL FIELD

The present invention relates to an image forming apparatus and, more specifically, to an image forming apparatus constituting an image forming system together with a terminal device connected via a communication link.

BACKGROUND ART

As one type of information equipment, image forming apparatuses have been introduced to many places of business (companies and offices). Such an image forming apparatus is connected to a terminal device through a communication link, receives image data transmitted from the terminal device, and prints an image based on the image data.

In an image forming system including a terminal device and an image forming apparatus, sometimes communication fails by some cause or other while image data is being transmitted from the terminal device to the image forming apparatus. In such a situation, transmission of the image data from the terminal device to the image forming apparatus is stopped and, therefore, printing cannot be executed.

Recently, it is becoming more popular to use wireless transmission for printing by the image forming apparatus. When image data is to be transferred from the terminal device to the image forming apparatus through a wireless link, it is difficult to maintain satisfactory communication between the terminal device and the image forming apparatus if the state of wireless link (for example, radio wave condition) deteriorates. Then, satisfactory transfer of image data from the terminal device to the image forming apparatus becomes impossible.

Patent literature 1 as indicated below discloses an information processing apparatus connected to a printing apparatus through a wireless link. The information processing apparatus transmits print data to the printing apparatus, and instructs execution of printing of the print data that has been transmitted to the printing apparatus. Further, the information processing apparatus detects the status of wireless link, and controls the operation of instructing print execution in accordance with the detected link status. Specifically, if the status of wireless communication is bad, the information processing apparatus stops the operation of instructing execution of printing.

According to Patent Literature 1, since the operation of instructing execution of printing is stopped by the information processing apparatus if the status of wireless link is unsatisfactory, it is possible to prevent execution of printing when transfer of print data to the printing apparatus fails.

CITATION LIST

Patent Literature

Patent Literature 1: Japanese Patent Laying-Open No. 2011-123592

SUMMARY OF INVENTION

Technical Problem

When the operation of instructing print execution is stopped by the information processing apparatus of Patent Literature 1, the process of executing printing ends, and therefore, if communication is interrupted, it is necessary to wait until good link status is recovered and to start data communication again. Thus, restart of communication requires much time and trouble.

The present invention was made to solve the above-described problem, and an object of the present invention is to provide an image forming apparatus that can save the time and trouble when restarting communication, even if communication is interrupted during transfer of image data.

Solution to Problem

In order to attain the above-described object, the present invention provides: an image forming apparatus, connected to a terminal device through a communication link, receiving image data transmitted from the terminal device and forming an image based on the image data, including: link state detecting means for detecting whether communication with the terminal device is interrupted or not, by detecting a state of communication link; and data suspending means, responsive to detection by the link state detecting means of an interruption of communication, for suspending an unfinished state of reception of the image data.

The image forming apparatus detects whether or not communication with the terminal device is interrupted. If it is detected that communication is interrupted during reception of image data transmitted from the terminal device, the image forming apparatus suspends the state of image data reception that is halfway through. Specifically, if communication is interrupted, the image forming apparatus records the unfinished state (communication up to the interrupted point). Therefore, when communication is resumed (recovered), it is possible for the image forming apparatus to receive the image data from the middle. Thus, even if communication is interrupted during reception of image data, it is possible to receive the data transmission from the middle and, therefore, time and labor at the restart can be saved.

Preferably, the communication link includes a wireless link; and the image forming apparatus further includes wireless communication means for communicating with the terminal device through the wireless link.

While image data transmitted from the terminal device is being received, if the user using the terminal device walks away with the terminal device and goes out of the range of wireless communication, transmission is stopped. Then, the image forming apparatus of the present invention suspends the interrupted state of communication. Therefore, when the user comes back and enters the range of wireless communication and communication restarted, data communication can be resumed from the middle. Thus, the time and labor at the time of restart can efficiently be saved.

More preferably, the image forming apparatus further includes: time measuring means for measuring time elapsed after the detection of the interruption of communication by the link state detecting means; means for receiving, when the data suspending means is suspending an unfinished state of communication and communication is resumed within a prescribed time period from the detection of the interruption of communication by the link state detecting means, the image data from the suspended unfinished state; and means for discarding the received image data, when the data suspending means is suspending an unfinished state of communication and communication is not resumed within a prescribed time period from the detection of the interruption of communication by the link state detecting means.

It is likely that data transmission (transfer) is resumed, if it is within a prescribed time period from when interruption of communication is detected by the link state detecting means. Therefore, it is preferable that the image forming apparatus is configured to be able to receive image data from the suspended unfinished state of communication, if the communication restarts within a prescribed time period from when the link state detecting means detected the interruption of communication. On the other hand, if the prescribed time period passed from when the link state detecting means detected the interruption of communication, it is unlikely that the data transmission restarts, or it is more likely that the data transmission is started anew. Therefore, it is preferable that the image forming apparatus is configured to discard the received image data if communication is not resumed within a prescribed time period from when the link state detecting means detected the interruption of communication. Thus, waste of memory area for storing the image data can be prevented.

More preferably, the image forming apparatus further includes means for starting image formation, after reception of image data is completed.

The image forming apparatus starts image formation (printing) after the reception of image data is completed. In other words, the image forming apparatus does not start printing until the data is fully received. Therefore, even when communication is stopped during transfer of the image data and the data communication is restarted from the middle when the communication is resumed, print outputs will not be scattered and lost (separated). This also saves time and labor at the time of restart.

According to a second aspect, the present invention provides a terminal device, connected to an image forming apparatus through a wireless link, including: transmitting means for transmitting image data to the image forming apparatus; link state detecting means for detecting whether communication with the image forming apparatus is interrupted or not, by detecting a state of wireless link; and data suspending means, responsive to detection by the link state detecting means of an interruption of communication while image data is being transmitted to the image forming apparatus, for suspending an unfinished state of transmission of the image data.

The terminal device detects whether or not the communication with the image forming apparatus is interrupted. If it detects interruption of communication while image data is being transmitted to the image forming apparatus, the terminal device suspends the unfinished state of image data transmission. Therefore, when communication is resumed (recovered), it is possible for the terminal device to transmit the image data from the middle. Thus, even if communication is interrupted during transmission of image data, it is possible to restart the data transmission from the middle when the communication is resumed and, therefore, time and labor at the time of restart can be saved.

Preferably, the terminal device further includes: wireless link state detecting means for detecting a state of wireless link; and notifying means for giving an alarm notice related to the state of wireless link in accordance with the state of wireless link detected by the wireless link state detecting means while image data is being transmitted to the image forming apparatus.

By way of example, if the radio wave condition for wireless link deteriorates, the terminal device notifies the user of the state of wireless link that the radio wave condition is bad, as an alarm related to the state of wireless link. By this notification, the user recognizes the state of wireless link (for example, that the radio wave condition is bad). This may urge the user to move to a range of better radio wave condition, and as a result, may ensure improved radio wave condition.

More preferably, the terminal device further includes inquiry means, responsive to detection of the interruption of communication by the link state detecting means while image data is being transmitted to the image forming apparatus, for inquiring whether an unfinished state of communication is to be suspended or not.

Since an inquiry is made as to whether the unfinished state of communication is to be suspended, it becomes possible for the user to select whether or not the unfinished state of communication is to be suspended. The user can suspend the unfinished state of communication only when he/she wishes to do so.

According to a third aspect, the present invention provides an image forming system, including a terminal device transmitting image data, and an image forming apparatus connected to the terminal device through a communication link, receiving the image data transmitted from the terminal device and forming an image based on the image data, including: link state detecting means for detecting whether communication between the terminal device and the image forming apparatus is interrupted or not, by detecting a state of communication link; and data suspending means, responsive to detection by the link state detecting means of an interruption of communication while image data is being transmitted from the terminal device to the image forming apparatus, for suspending an unfinished state of communication.

The image forming system detects whether or not the communication between the image forming apparatus and the terminal device is interrupted. If it is detected that the communication is interrupted during transmission of image data from the terminal device to the image forming apparatus, the present image forming system suspends the interrupted state. Specifically, the present image forming system records the unfinished state of communication (up to the time point when the communication is stopped). Therefore, when communication is resumed (recovered), it is possible to restart data transfer from the unfinished state. This saves time and labor at the time of restart.

Preferably, the communication link includes a wireless link; and each of the terminal device and the image forming apparatus further includes wireless communication means for communicating with each other in a wireless manner through the wireless link.

While image data is being transmitted from the terminal device to the image forming apparatus, if the user using the terminal device walks away with the terminal device and goes out of the range of wireless communication, transmission is stopped. In such a situation, the image forming system of the present invention suspends the unfinished state of communication. Therefore, when the user comes back and enters the range of wireless communication and communication restarts, data communication can be resumed from the middle. Thus, the time and labor at the time of restart can efficiently be saved.

Further, when image data of a large data size is to be transmitted from the terminal device to the image forming apparatus by a wireless link, with a conventional system, the user using the terminal device must stay within the range allowing wireless communication. If the user should move and go out of the communicable range, the communication is stopped and the data communication must be started anew. In contrast, by the present image forming system, even if the user goes out of the range allowing wireless communication, data communication can be resumed from the middle and, hence, the user can move freely while holding the terminal device.

More preferably, the data suspending means includes means for enabling the image forming apparatus to suspend an unfinished state of receiving the image data.

The user suspends the unfinished state of reception of the image data. Therefore, when the communication is resumed, the image forming apparatus can receive the image data from the middle.

More preferably, the data suspending means includes means for enabling the terminal device to suspend an unfinished state of transmitting the image data and means for enabling the image forming apparatus to suspend an unfinished state of receiving the image data.

The terminal device suspends the unfinished state of image data transmission. Therefore, when communication is resumed, it is possible for the terminal device to transmit the image data from the middle. The image forming apparatus suspends the unfinished state of image data reception. Therefore, when communication is resumed, it is possible for the image forming apparatus to receive the image data from the middle.

According to a fourth aspect, the present invention provides a computer program, causing a computer connected to an image forming apparatus through a communication link to function as: means for transmitting image data to the image forming apparatus; link state detecting means for detecting whether communication with the image forming apparatus is interrupted or not, by detecting a state of the communication link; and data suspending means, responsive to detection by the link state detecting means of an interruption of communication while image data is being transmitted to the image forming apparatus, for suspending an unfinished state of transmission of the image data.

Advantageous Effects of Invention

As described above, by the present invention, an image forming apparatus and the like that saves time and labor when communication is resumed, even if communication is interrupted during transfer of image data, can easily be obtained.

DESCRIPTION OF EMBODIMENTS

Figure 1:
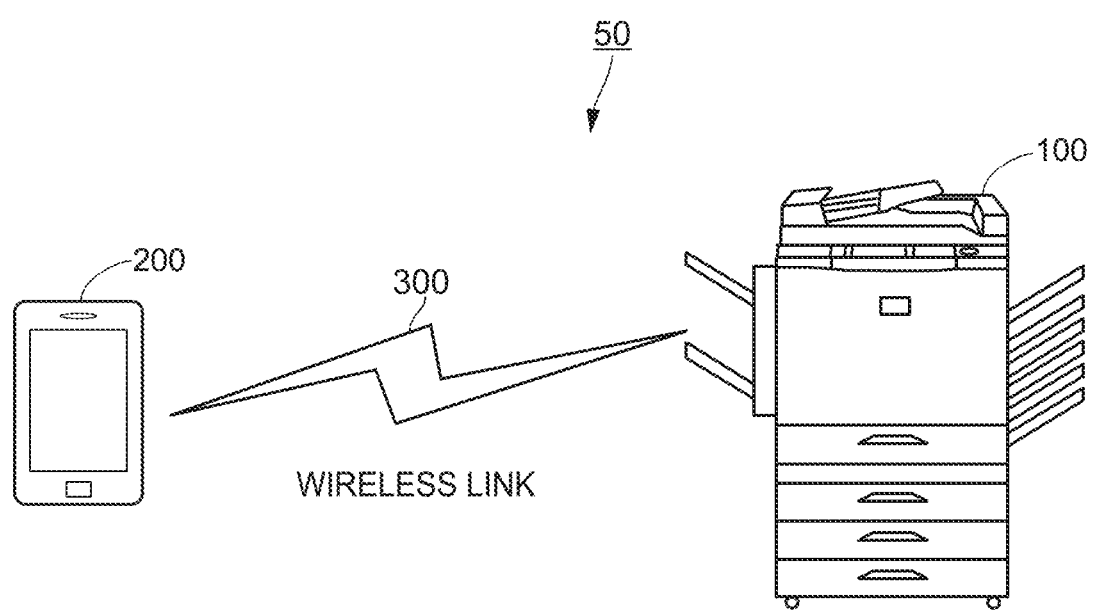
FIG. 1 shows an overall configuration of an image forming system in accordance with an embodiment of the present invention.

In the following embodiments, the same components are denoted by the same reference numerals. Their functions and names are also the same. Therefore, detailed descriptions thereof will not be repeated.

[Overall System Configuration]

Referring to FIG. 1, an overall configuration of an image forming system 50 in accordance with the present embodiment will be described. Image forming system 50 includes a multifunction peripheral (MFP) 100 as one type of image forming apparatus, and a terminal device 200 that issues a print request to MFP 100. MFP 100 has, for example, a copy function and a printer function. MFP 100 receives a print instruction from terminal device 200 and prints an image on a sheet of recording paper. Terminal device 200 is a smart phone. MFP 100 and terminal device 200 are connected to be communicable with each other through a wireless link 300.

When MFP 100 and terminal device 200 are connected by wireless link 300, it becomes difficult to maintain satisfactory communication between terminal device 200 and MFP 100 if the state of wireless link 300 (for example, radio wave condition) deteriorates. In that case, satisfactory transfer of image data from terminal device 200 to MFP 100 becomes difficult.

Figure 2:
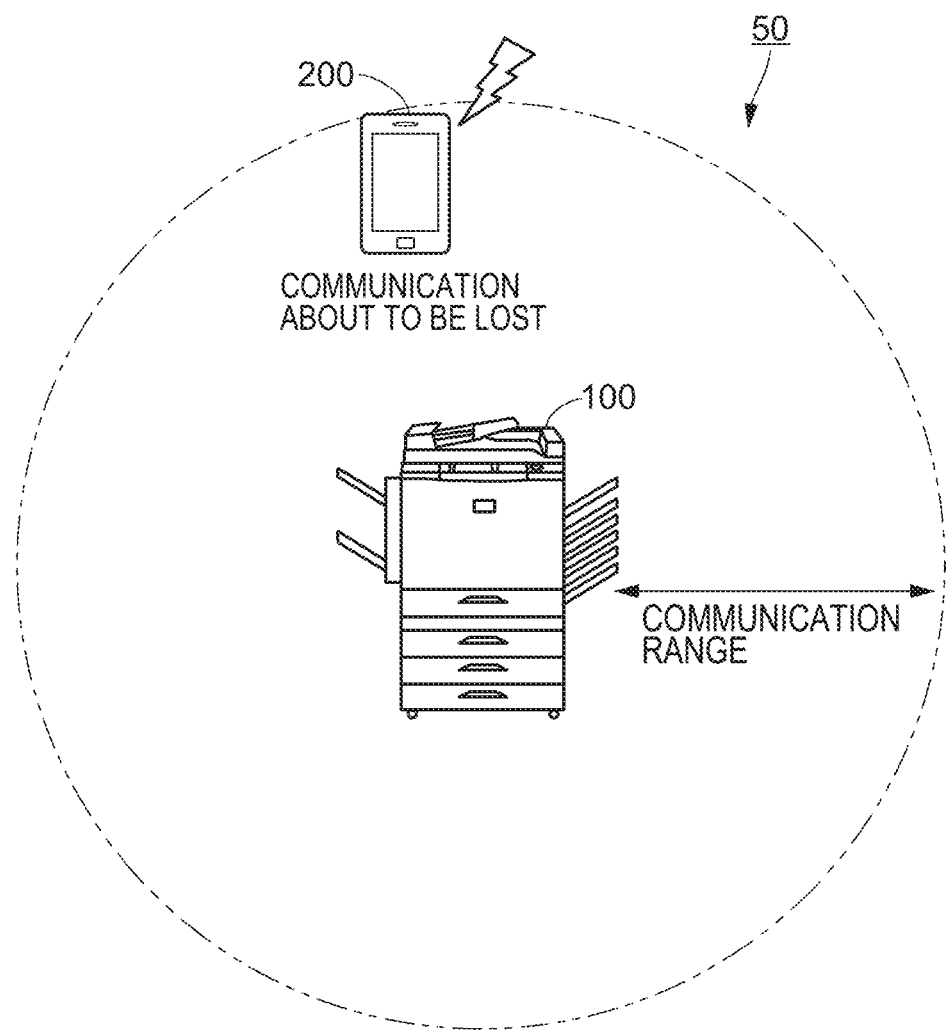
FIG. 2 shows the image forming system in accordance with an embodiment of the present invention (in a state in which communication is about to be lost).

Referring to FIG. 2, the state of connection of wireless link 300 changes depending, for example, on the distance between terminal device 200 and MFP 100. By way of example, when terminal device 200 moves away from MFP 100, intensity of radio wave decreases. Even when terminal device 200 is within a communication range with MFP 100, if the terminal device is too far from MFP 100, the radio wave intensity becomes weak and communication tends to be lost. In the present embodiment, if the communication is about to be lost while image data is being transmitted from terminal device 200 to MFP 100, an alarm is displayed on terminal device 200 to notify the user of the bad radio wave condition. By this notification, the user is urged to move to a range of better radio wave intensity. As the user holding the terminal device 200 moves closer to MFP 100, the radio wave condition is improved.

Figure 3:
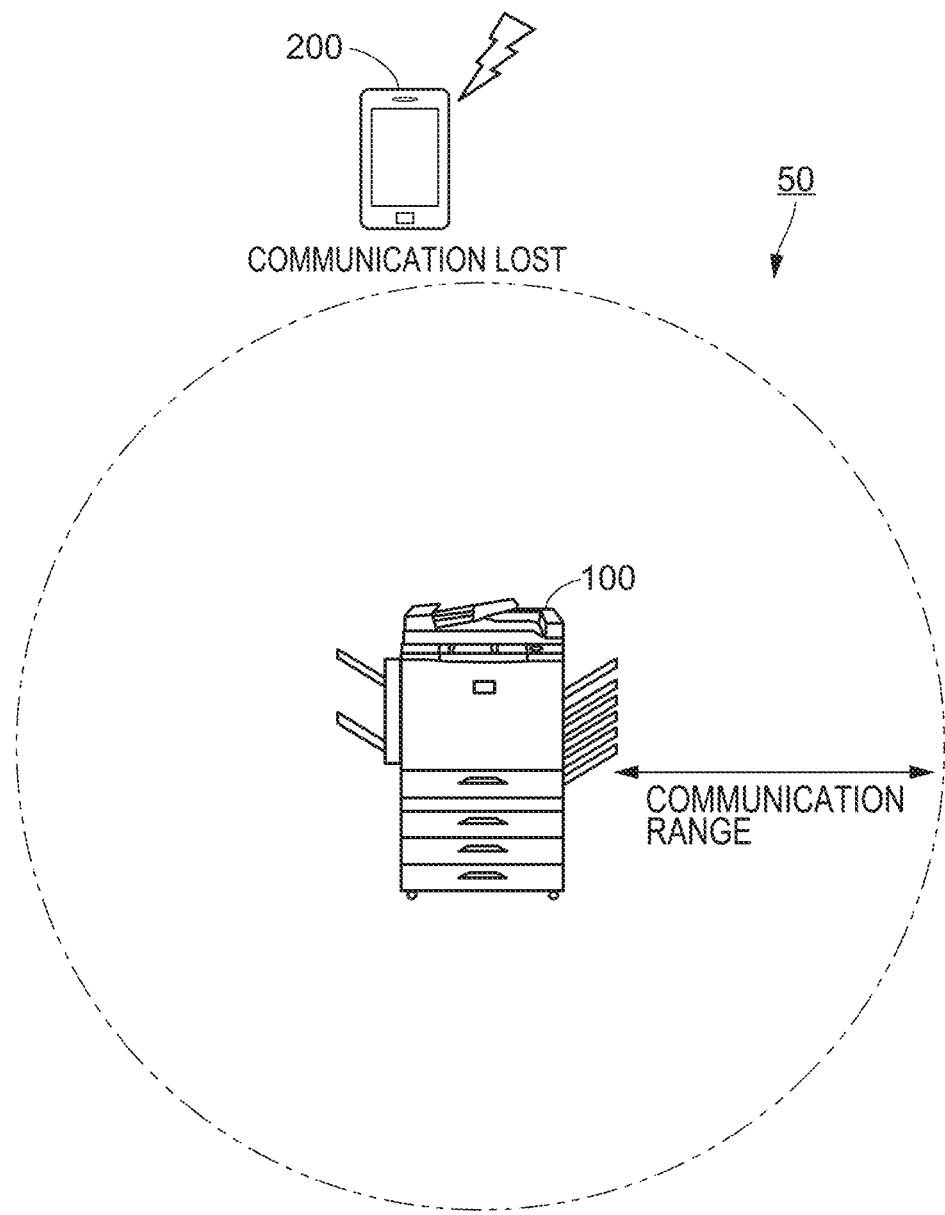
FIG. 3 shows the image forming system in accordance with an embodiment of the present invention (in a state in which communication is lost).

Referring to FIG. 3, when MFP 100 and terminal device 200 are connected by wireless link 300, it is impossible to visually recognize the range in which communication is possible. Therefore, it is possible that the user holding terminal device 200 unintentionally goes out of the range of communication with MFP 100. In such a situation, communication fails. If the communication fails while image data is being transmitted from terminal device 200 to MFP 100, transfer of image data from terminal device 200 to MFP 100 becomes impossible. In the present embodiment, if the communication fails during transmission of image data from terminal device 200 to MFP 100, terminal device 200 and MFP 100 suspend the interrupted state halfway through the communication. Therefore, when communication between terminal device 200 and MFP 100 resumes, it is possible to restart printing from the interrupted point.

[Hardware Configuration]

«MFP 100»

Figure 4:
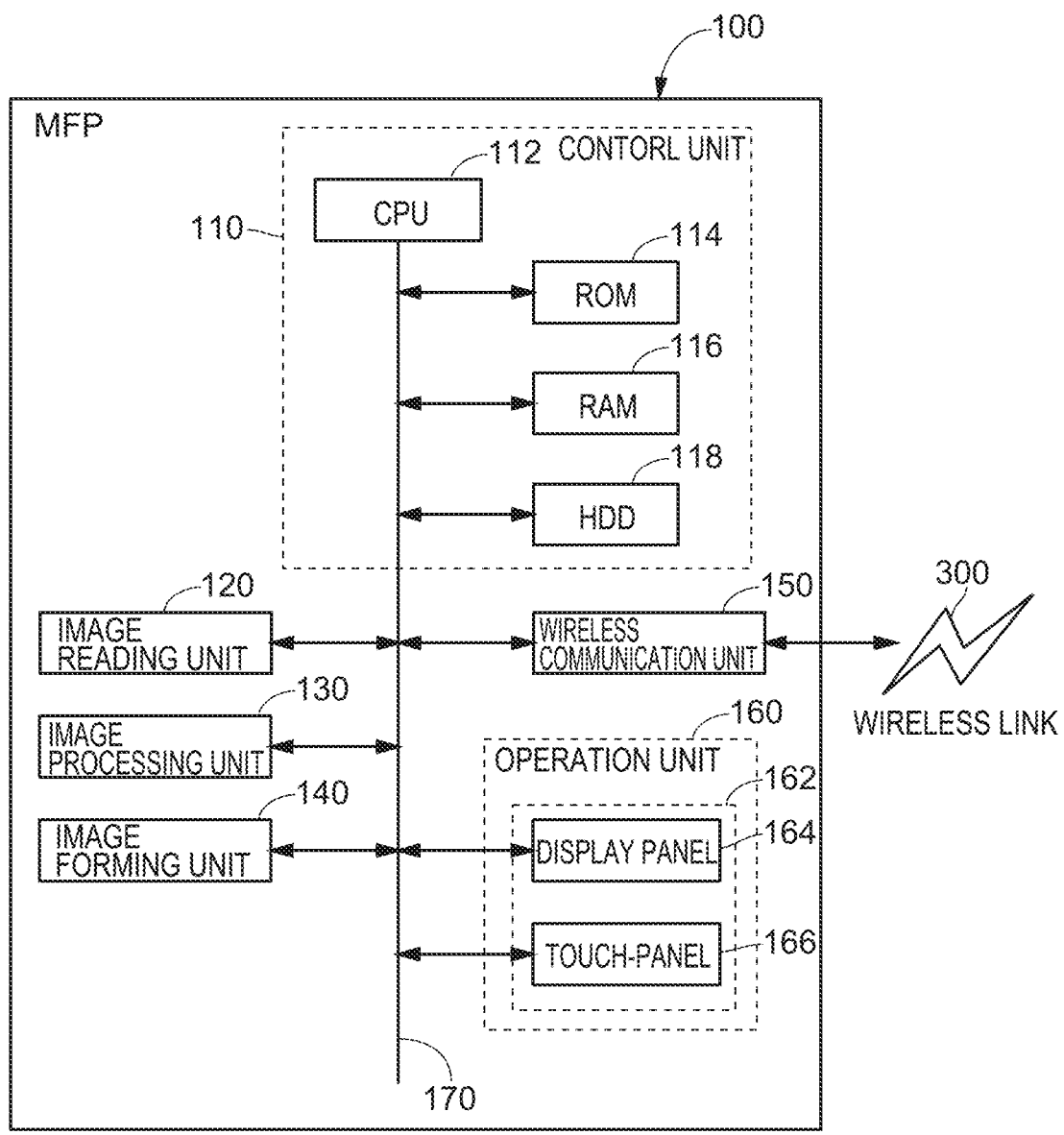
FIG. 4 is a control block diagram showing a hardware configuration of a multifunction peripheral shown in FIG. 1

Referring to FIG. 4, MFP 100 constituting the present image forming system 50 includes a control unit 110, an image reading unit 120, an image processing unit 130, an image forming unit 140, a wireless communication unit 150 and an operation unit 160.

Control unit 110 is substantially a computer, including a CPU (Central Processing Unit) 112, an ROM (Read Only Memory) 114, an RAM (Random Access Memory) 116, and an HDD (Hard Disk Drive) 118. To CPU 112, a BUS line 170 is connected, and to BUS line 170, ROM 114, RAM 116 and HDD 118 are electrically connected. CPU 112 executes various computer programs in accordance with instructions from operation unit 160 and the like, whereby desired processes such as operations of various units of MFP 100 and communication with terminal device 200 are executed. The various computer programs mentioned above are stored in advance in ROM 114 or HDD 118, and when a desired process is to be executed, the program or programs are read from ROM 114 or HDD 118 and transferred to RAM 116. CPU 112 reads and interprets an instruction of a program from an address in RAM 116, which is designated by a value stored in a register referred to as a program counter, not shown. Further, CPU 112 reads data necessary for an operation from an address designated by the read instruction, and executes a process corresponding to the instruction, on the data. The result of execution is also stored in RAM 116, HDD 118 or a register or the like in CPU 112, at an address designated by an instruction.

HDD 118 stores a computer program for realizing general operations of MFP 100. The computer program is provided by an information processing apparatus or the like through a network or the like, not shown. The computer program may be provided by a storage medium such as a DVD, having the computer program recorded thereon. Specifically, a DVD as a medium for recording the computer program may be mounted on a DVD drive (not shown) built in MFP 100, and the computer program may be read from the DVD and installed in HDD 118. HDD 118 also stores various data including image data.

To BUS line 170, image reading unit 120, image processing unit 130, image forming unit 140, wireless communication unit 150 and operation unit 160 are further electrically connected.

Image reading unit 120 includes a document detection sensor and a CCD (Charge Coupled Device) line sensor (both not shown). The document detection sensor irradiates an image-bearing surface of a document placed on a platen (not shown) manually by the user or by an automatic document feeder (not shown) with light from a light source (not shown), and thereby obtains reflection light, and forms an image of the obtained reflection light on the CCD line sensor. The CCD line sensor executes photo-electric conversion of the formed reflection light image successively, and outputs the result as image data to image processing unit 130. Specifically, image reading unit 120 reads image information from the document placed on the platen at the time of copying or scanning the document by the document detection sensor, converts the read image information to electric signals by the CCD line sensor, and outputs the result as the image data to image processing unit 130.

Image processing unit 130 includes an MPU (Micro Processing Unit, not shown). Image processing unit 130 performs various processes including a prescribed image processing such as rasterization on the image data received from image reading unit 120, terminal device 200 or the like, and thereby creates print data of a prescribed tone, which is output to image forming unit 140.

Image forming unit 140 is to print the image represented by the image data on a sheet of recording paper and, by way of example, it includes: a photoreceptor drum, a charger, a laser scanning unit (LSU), a developer, a transfer device, a cleaning device, a fixing device and a neutralizer. In image forming unit 140, a conveying path, for example, is provided and a sheet of recording paper fed from a paper feed unit (not shown) is conveyed along the conveying path. The paper feed unit draws out sheets of recording paper stacked on a paper feed cassette (not shown) or on a manual feed tray one by one, and feeds the sheet of paper to the paper conveying path of image forming unit 140. While the sheet of recording paper is fed along the conveying path of image forming unit 140, the sheet passes between the photoreceptor drum and the transfer device, and further passes through the fixing device, whereby printing is done on the sheet of recording paper.

The photoreceptor drum rotates in one direction, and its surface is cleaned by the cleaning device and the neutralizer and, thereafter, uniformly charged by the charger. The laser scanning unit modulates the laser beam based on the image data to be printed, and repeatedly scans the surface of photoreceptor drum with the modulated laser beam in a main scanning direction, whereby an electrostatic latent image is formed on the surface of photoreceptor drum. The developer develops the electrostatic latent image by supplying toner to the surface of photoreceptor drum, and thus, a toner image is formed on the surface of photoreceptor drum. The transfer device transfers the toner image on the surface of photoreceptor drum to the sheet of recording paper passing between the transfer device and the photoreceptor drum.

The fixing device includes a heating roller for heating the sheet of recording paper and a pressure roller for pressing the sheet of recording paper. As the sheet of recording paper is heated by the heating roller and pressed by the pressure roller, the toner image that has been transferred to the sheet of recording paper is fixed on the sheet. The sheet of recording paper discharged from the fixing device (printed sheet) is discharged to a paper discharge tray.

Wireless communication unit 150 provides an interface with wireless link 300. MFP 100 communicates with an external device (in the present embodiment, terminal device 200) through wireless communication unit 150. MFP 100 can receive instruction signals instructing execution of various processes such as a print job, from terminal device 200 through wireless communication unit 150. Wireless communication unit 150 further measures radio wave intensity of wireless link 300 and measures speed of communication of wireless link 300. Further, wireless communication unit 150 detects whether or not communication with terminal device 200 fails during reception of image data transmitted from terminal device 200.

Operation unit 160 includes a touch-panel display 162. Touch-panel display 162 is a touch-panel integrated type liquid crystal display device, formed by stacking display panel 164 and touch-panel 166. Display panel 164 presents various pieces of information related to the state of MFP 100 as well as states of various processes. Touch-panel display 162 also provides an interactive operation interface with the user. The interactive operation interface receives a user instruction related to the overall operation of MFP 100, displays the contents of instruction on display panel 164, and outputs a control signal in accordance with the instruction to control unit 110 or to the MPU of image processing unit 130.

MFP 100 also has a quick print function of executing the print process while receiving the image data, and a print function of receiving image data first and executing the print process after reception of all image data is completed. Either of these functions can be set in MFP 100. For example, either of the functions can be set on a settings screen (not shown) displayed on operation unit 160 (display panel 164) of MFP 100. Specifically, when the quick print is to be set, the quick print function is turned ON, and if the quick print is not to be set, the quick print function is turned OFF. When the quick print function is turned OFF, the print function of executing the print process after reception of all image data is completed is set. These print functions can also be set by terminal device 200. In that case, MFP 100 changes the setting of itself upon reception of the settings instruction (settings information) transmitted from terminal device 200.

MFP 100 further has a function of suspending the interrupted state halfway through the communication, when it is detected that communication is interrupted during reception of image data transmitted from terminal device 200. Specifically, while the MFP 100 is receiving the image data transmitted from terminal device 200, if interruption of communication is detected, MFP 100 stores the data representing the unfinished state of communication in HDD 118. The data representing the unfinished state of communication includes: time information when the print job was received; identification information of terminal device 200; identification information of image data that has been received; stop position when the reception of image data is stopped by the interruption of communication; and the image data received before the interruption of communication. The identification information of terminal device 200 is, for example, a terminal ID or serial number of the terminal. The identification information of image data is, for example, its file name. If the quick print is set, the print process is executed while receiving the image data and, therefore, the image data received before the interruption of communication is not stored in HDD 118. Specifically, in this situation, the data representing the unfinished state of communication does not include the image data received before the interruption of communication.

Figure 6:
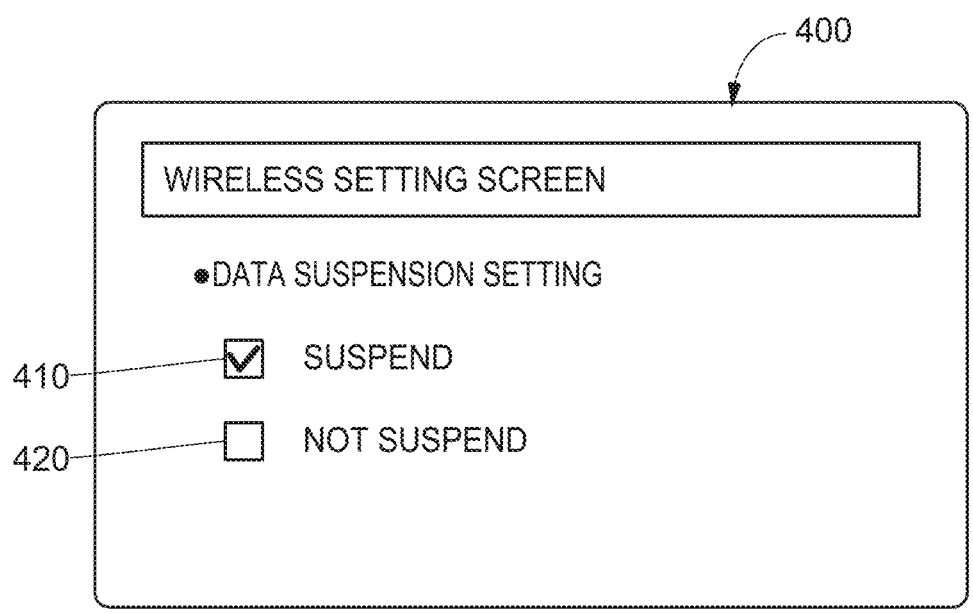
FIG. 6 shows an example of a screen image allowing wireless settings displayed on an operation unit of the multifunction peripheral.

The function of suspending the unfinished state of communication can be set in MFP 100. In the present embodiment, whether the unfinished state of communication is to be suspended or not can be set on wireless settings screen 400 displayed on operation unit 160 (display panel 164) of MFP 100. Referring to FIG. 6, wireless setting screen 400 includes a check box 410 to be checked when the data of the unfinished communication is to be suspended (hereinafter also referred to as "data suspension setting") and a check box 420 to be checked when the data of unfinished communication is not to be suspended.

Control unit 110 further has a timer function of measuring, if the communication is interrupted, elapsed time from the interruption. Control unit 110 detects whether the communication is resumed within a prescribed time period (for example, about 30 seconds to few minutes) after the interruption of communication. The prescribed time period can be set arbitrarily. If data received before the interruption of communication has been stored in HDD 118 and the communication is not resumed, the image data that has been stored in HDD 118 is discarded (deleted).

«Terminal Device 200»

Figure 5:
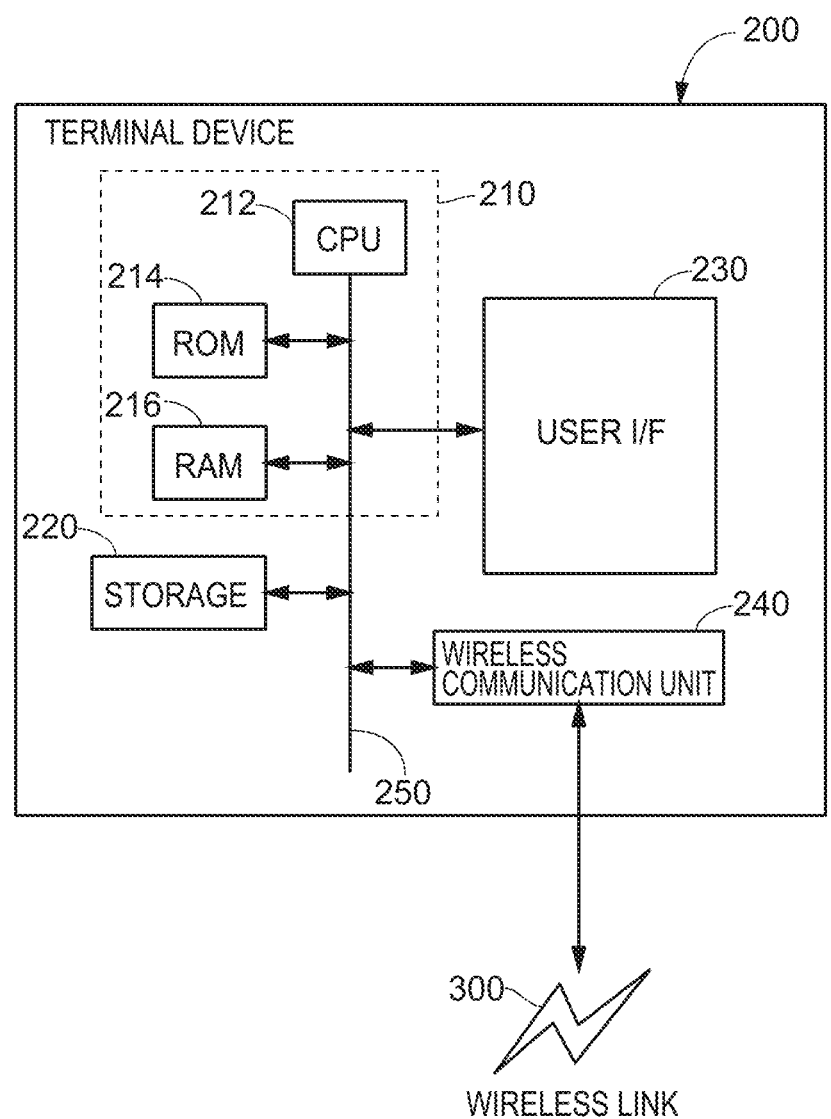
FIG. 5 is a control block diagram showing a hardware configuration of the terminal device shown in FIG. 1.

Referring to FIG. 5, terminal device 200 constituting present image forming system 50 includes a control unit 210, a storage device 220, a user interface (hereinafter referred to as user I/F) 230 and a wireless communication unit 240.

Control unit 210 is substantially a computer and it includes a CPU 212, an ROM 214 and an RAM 216. To CPU 212, a BUS line 250 is connected. To BUS line 250, ROM 214 and RAM 216 are electrically connected. CPU 212 executes various computer programs in accordance with instructions from user I/F 230, and thereby executes desired processes including operations of various units of terminal device 200 and communication with an external device (in the present embodiment, MFP 100).

To BUS line 250, storage device 220, user I/F 230 and wireless communication unit 240 are electrically connected. ROM 214, RAM 216, storage device 220, user I/F 230 and wireless communication unit 240 all operate in cooperation under the control of CPU 212, and as the terminal device in accordance with the present embodiment, terminal device 200 realizes processes of various applications. These applications realize, for example, the terminal device 200 of image forming system 50 that can save time and labor when communication is restarted, if the communication should be interrupted while image data stored in terminal device 200 is being transmitted to MFP 100.

Storage device 220 includes, for example, a flash memory drive such as an SSD (Solid State Drive) (not shown). Storage device 220 stores the applications mentioned above and computer programs for realizing general operations of terminal device 200. These computer programs and the like are provided by an information processing apparatus or the like through a network or the like, not shown. These computer programs and the like may be provided by a storage medium such as a DVD, having the computer programs and the like recorded thereon. Besides, storage device 220 stores various data including image data. Storage device 220 may include an HDD in place of, or in addition to the SSD.

User I/F 230 is implemented, for example, by an input/output device including an operation display device such as a touch-panel display.

Wireless communication unit 240 provides an interface with wireless link 300. Terminal device 200 communicates with an external device (in the present embodiment, MFP 100) through wireless communication unit 150. Terminal device 200 can transmit instruction signals to instruct execution of various processes including a print job, to MFP 100 through wireless communication unit 150. Further, wireless communication unit 240 detects whether or not communication with terminal device 200 fails during reception of image data transmitted from terminal device 200, under the control of control unit 210.

Further, wireless communication unit 240 measures radio wave intensity of wireless link 300 and measures speed of communication of wireless link 300. Terminal device 200 has a threshold value as a reference for determining whether the radio wave intensity decreased (or is sufficiently high), stored in advance in ROM 214, RAM 216, storage device 220 or the like. Control unit 210 compares the radio wave intensity measured by wireless communication unit 240 with the threshold value and thereby determines whether the radio wave intensity decreased. Further, if it is determined that the radio wave intensity decreased, control unit 210 displays a notification to that effect on user I/F 230.

Figure 7:
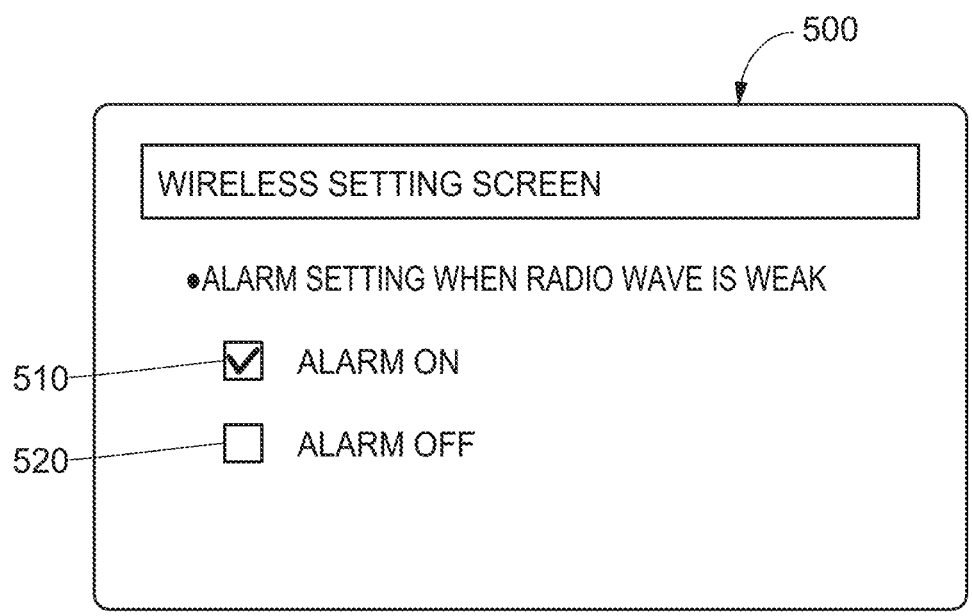
FIG. 7 shows an example of a screen image allowing wireless settings displayed on a user I/F of the terminal device.

The function of giving an alarm when the radio wave intensity decreases (the radio wave intensity becomes weak) can be set in terminal device 200. In the present embodiment, wireless setting screen 500 displayed on user I/F 230 of terminal device 200 is configured to allow setting of whether the alarm is to be given when the radio wave intensity is weak. Referring to FIG. 7, wireless settings screen 500 has, as the alarm settings when the radio wave intensity is weak, a check box 510 to be checked if the alarm is to be given, and a check box 520 to be checked if the alarm is not to be given.

Further, terminal device 200 has a function of suspending, when interruption of communication is detected while it is transmitting image data to MFP 100, the unfinished state interrupted halfway through the communication. Specifically, if interruption of communication is detected while image data is being transmitted to MFP 100, terminal device 200 stores the data indicating the unfinished state of communication, and the time information (job start time) when transmission of the print job was started, in storage device 220. The data indicating the unfinished state of communication includes the stop point when the transmission of image data was stopped because of the interruption of communication.

[Software Configuration]

Figure 8:
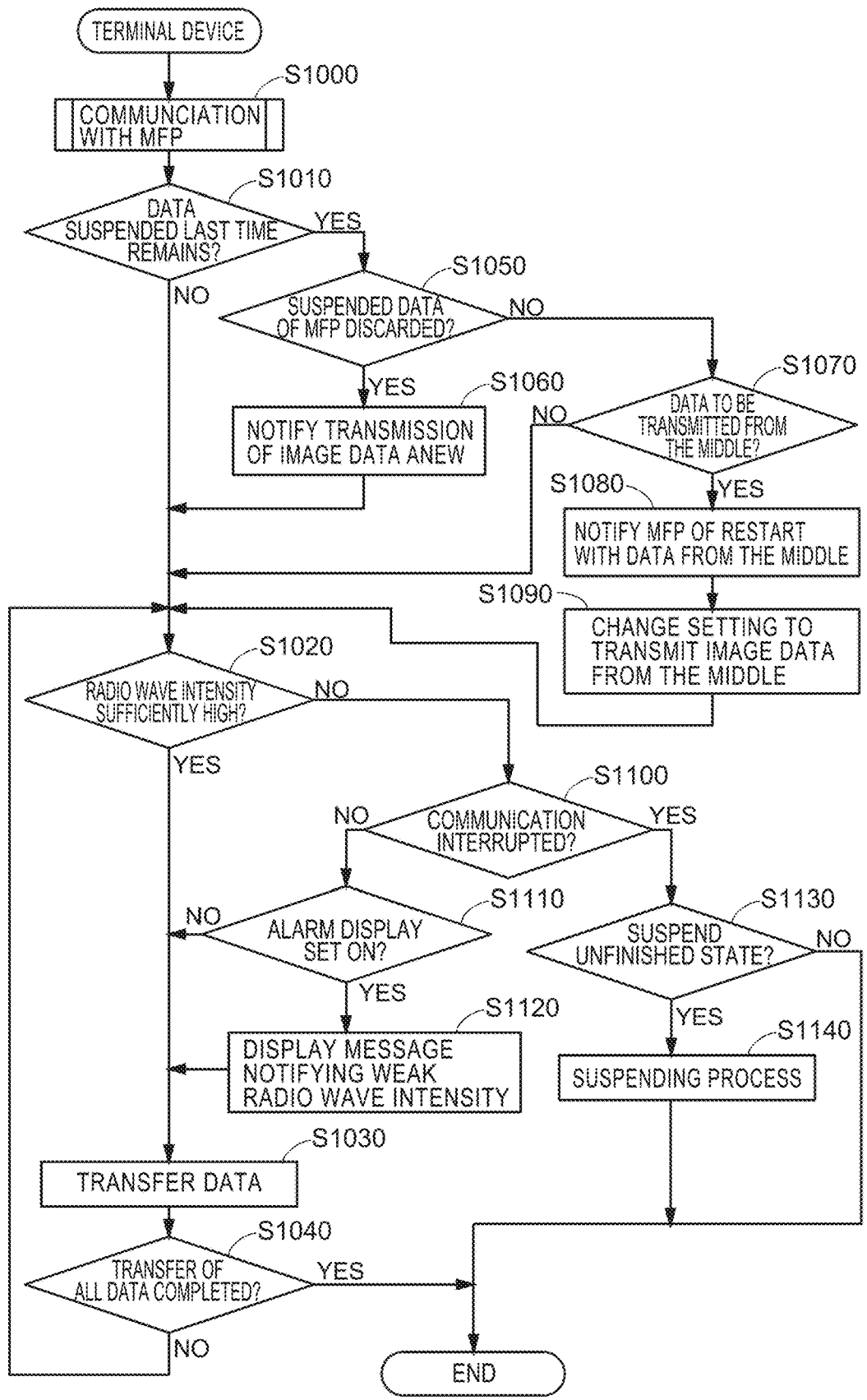
FIG. 8 is a flowchart representing a control structure of a program executed by the terminal device shown in FIG. 1.

Referring to FIG. 8, the control structure f a computer program executed by terminal device 200 for issuing a print request from terminal device 200 to MFP 100 in the image forming system 50 of the present invention will be described. The program is activated when an operation for issuing a print request is done by the user.

The program includes: a step S1000 of executing a communication process with MFP 100; a step S1010 executed after step S1000, of determining whether data suspended last time for the image data selected by the user remains in terminal device 200, and branching the flow of control depending on the result of determination; a step S1020, executed if it is determined at step S1010 that no suspended data remains, of determining whether or not the radio wave intensity of wireless link 300 is sufficiently high, and branching the flow of control depending on the result of determination; a step S1030, executed if it is determined at step S1020 that the radio wave intensity is sufficiently high, of transferring image data stored in terminal device 200 to MFP 100; and a step S1040, executed after step S1030, of determining whether or not transfer of all data is completed, and branching the flow of control depending on the result of determination.

At step S1010, determination is made as to whether or not the communication was interrupted during transmission of image data last time and the unfinished state of communication has been suspended. At step S1020, the radio wave intensity measured by wireless communication unit 240 is compared with the threshold value stored in the ROM or the like, to determine whether the radio wave intensity is higher than the threshold value. If the radio wave intensity measured by wireless communication unit 240 is larger than the threshold value, control unit 210 determines that the radio wave intensity is sufficiently high. On the other hand, if the radio wave intensity measured by wireless communication unit 240 is equal to or lower than the threshold value, control unit 210 determines that the radio wave intensity is not sufficiently high (radio wave intensity is weak (deteriorated)). At step S1030, image data selected by the user is transmitted to MFP 100. At step S1040, if it is determined that transfer of all data is not yet completed, the control returns to step S1020 and if it is determined that transmission of all data is completed, the program ends.

The program further includes: a step S1050, executed if it is determined at step S1010 that data suspended last time remains, of determining whether suspended data in MFP 100 (image data that had been received before the communication was interrupted) has been discarded or not, and branching the flow of control depending on the result of determination; and a step S1060, executed if it is determined at step S1050 that the suspended data in MFP 100 has been discarded, of notifying transmission of image data from the start, and proceeding to step S1020.

Figure 10:
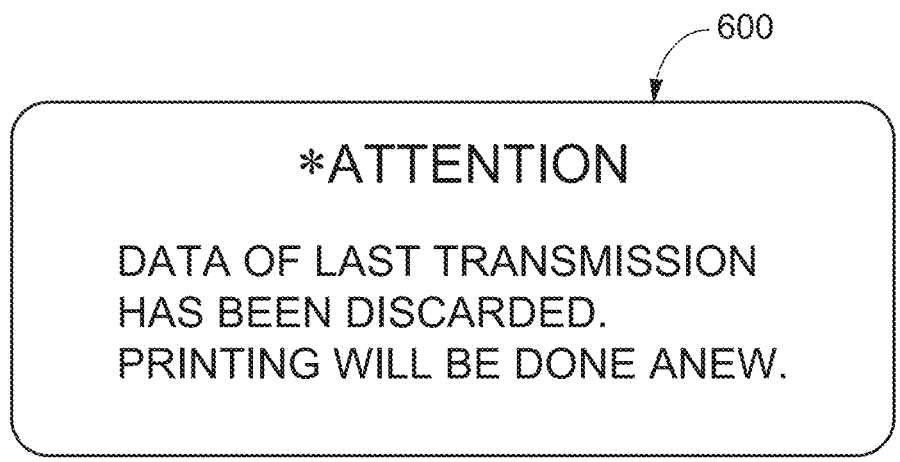
FIG. 10 shows an example of a dialogue displayed on the user I/F of the terminal device.

At step S1060, a dialogue 600 shown in FIG. 10 is displayed on user I/F 230 (touch-panel display) of terminal device 200. Referring to FIG. 10, on dialogue 600, a text such as "Data of last transmission has been discarded. Printing will be done anew" is displayed. At step S1060, the data representing the unfinished state of communication suspended in terminal device 200 at the time of last transmission of image data is discarded.

The program further includes: a step S1070, executed if it is determined at step S1050 that the data suspended in MFP 100 is not discarded, of determining whether the image data is to be transmitted from the middle, and branching the flow of control depending on the result of determination; a step S1080, executed if it is determined at step S1070 that the image data is to be transmitted from the middle, of notifying MFP 100 that data transmission will be resumed from the middle; and a step S1090, executed after step S1080, of changing the setting to transmit the image data from the middle and proceeding to step S1020. If it is determined at step S1070 that the image data is not to be transmitted from the middle, the control proceeds to step S1020.

Figure 11:
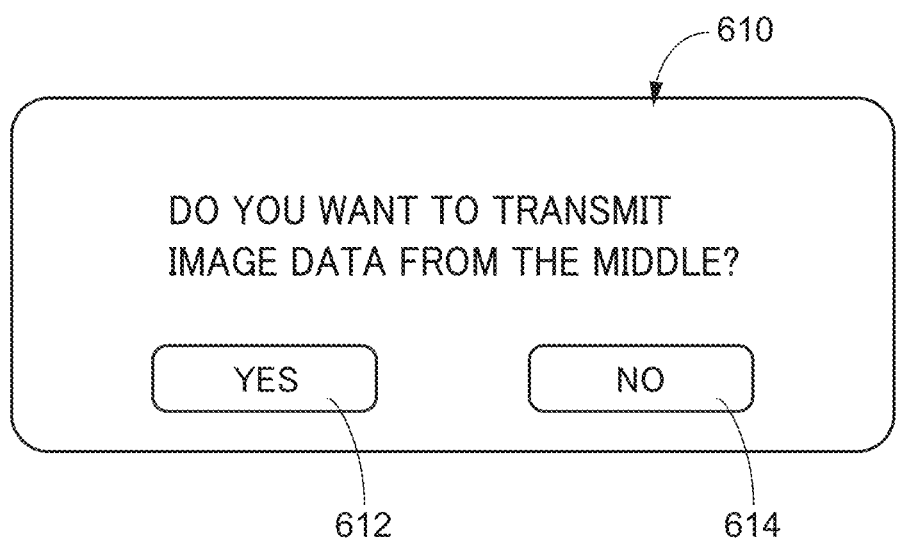
FIG. 11 shows an example of a dialogue displayed on the user I/F of the terminal device.

At step S1070, a dialogue 610 shown in FIG. 11 is displayed on user I/F 230 (touch-panel display) of terminal device 200. Referring to FIG. 11, on dialogue 610, a text inquiring "Do you want to send image data from the middle?" and "YES" key 612 and "NO" key 614 are displayed. If the user operates "YES" key 612, control unit 210 determines that the image data is to be transmitted from the middle. If the user operates "NO" key 614, control unit 210 determines that the image data is not to be transmitted from the middle (the image data should be transmitted from the start). At step S1080, terminal device 200 transmits an instruction to send the image data from the middle (from the position where the transmission stopped last time) to MFP 100.

The program further includes: a step S1100, executed if it is determined at step S1020 that the radio wave intensity is insufficient, of determining whether the communication is interrupted, and branching the flow of control depending on the result of determination; a step S1110, executed if it is determined at step S1100 that the communication is not interrupted, of determining whether the setting of alarm indication is ON or not, and branching the flow of control depending on the result of determination; and a step S1120, executed if it is determined at step S1110 that the setting of alarm indication is ON, of displaying a message notifying weak radio wave intensity, and proceeding to step S1030. If it is determined at step S1110 that the setting of alarm indication is not ON, the control proceeds to step S1030.

At step S1110, whether the setting of alarm indication is ON is determined, based on which of the check boxes 510 and 520 is checked on wireless setting screen 500 shown in FIG. 7. If check box 510 is checked, control unit 210 determines that the alarm indication setting is ON. If check box 520 is checked, control unit 210 determines that the alarm indication setting is not ON (OFF).

Figure 12:
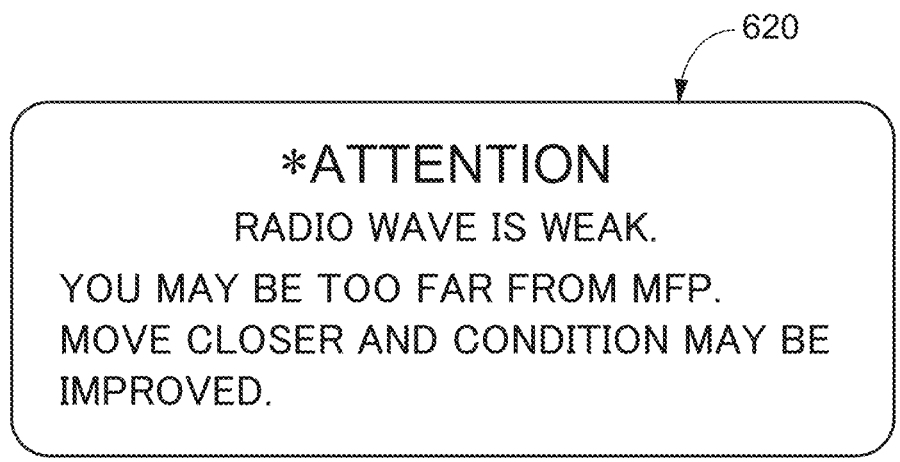
FIG. 12 shows an example of a dialogue displayed on the user I/F of the terminal device.

At step S1120, a dialogue 620 shown in FIG. 12 is displayed on user I/F 230 (touch-panel display) of terminal device 200. Referring to FIG. 12, on dialogue 620, a text such as "Radio wave is weak. You may be too far from MFP. Move closer and condition may be improved." is displayed. By displaying dialogue 620 as such, terminal device 200 notifies the user of the unsatisfactory radio wave condition, as an alarm related to the state of wireless link.

The program further includes: a step S1130, executed if it is determined at step S1100 that the communication is interrupted, of determining whether or not the unfinished state is to be suspended, and branching the flow of control depending on the result of determination; and a step S1140, executed if it is determined at step S1130 that the unfinished state is to be suspended, of executing the suspending process and then ending the program. If it is determined at step S1130 that the unfinished state is not to be suspended, the program ends.

Figure 13:
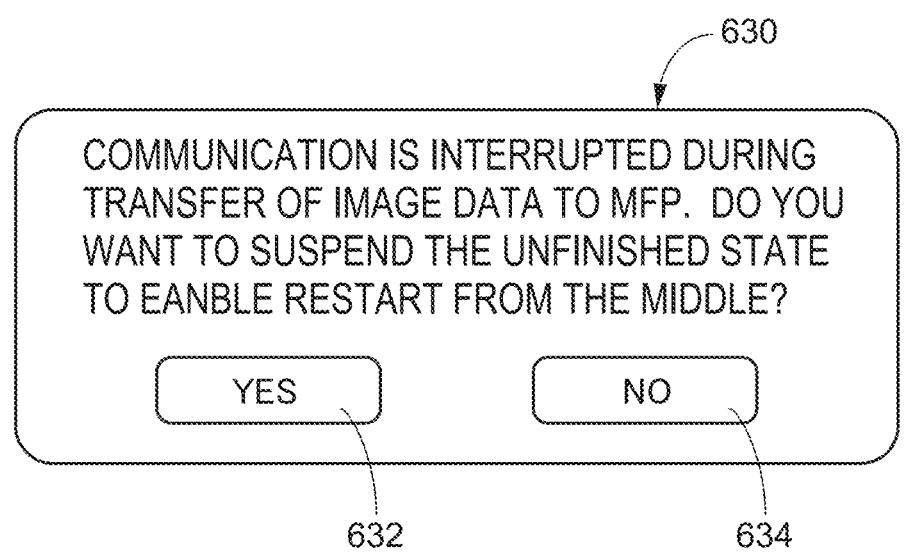
FIG. 13 shows an example of a dialogue displayed on the user I/F of the terminal device.

At step S1130, a dialogue 630 shown in FIG. 13 is displayed on user I/F 230 (touch-panel display) of terminal device 200. Referring to FIG. 13, on dialogue 630, a text inquiring "Communication is interrupted during transfer of image data to MFP. Do you want to suspend the unfinished state to enable restart from the middle?", a "YES" key 632 and a "NO" key 634 are displayed. If the user operates "YES" key 632, control unit 210 determines that the unfinished state is to be suspended. If the user operates "NO" key 634, control unit 210 determines that the unfinished state is not to be suspended.

Figure 9:
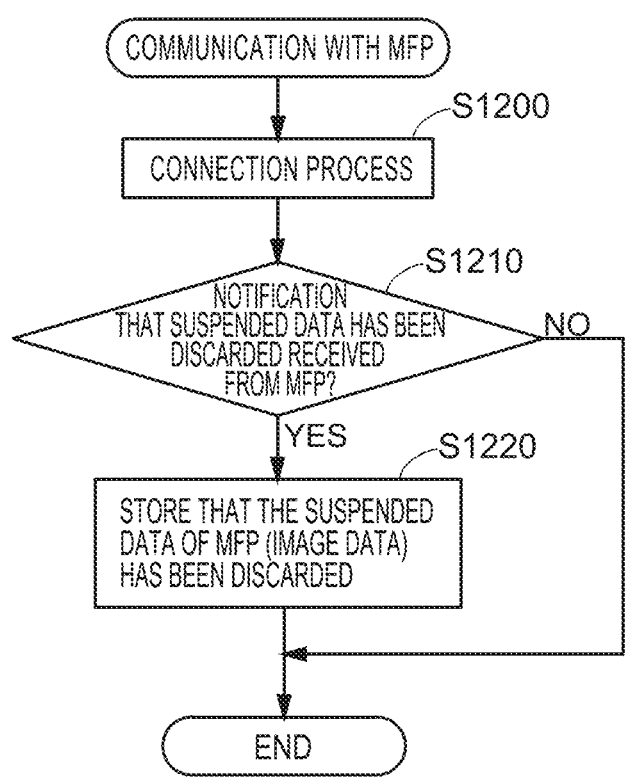
FIG. 9 shows a detailed flow of step S1000 of FIG. 8.

FIG. 9 is a detailed flow of step S1000 shown in FIG. 8. Referring to FIG. 9, this routine includes: a step S1200 of executing a process of connecting to MFP 100 through wireless link 300; a step S1210, executed after step S1200, of determining whether or not discard of suspended data is notified from MFP 100, and branching the flow of control depending on the result of determination; and a step S1220, executed if it is determined at step S1210 that the discard of suspended data is notified from MFP 100, of storing the fact of discard of suspended data of MFP 100 in, for example, storage device 220, and ending the routine. The routine also ends if it is determined at step S1210 that the data discard is not notified from MFP 100.

At step S1050 shown in FIG. 8, based on the information stored at step S1220 of FIG. 9 that the suspended data of MFP 100 has been discarded, whether the suspended data of MFP 100 is discarded or not is determined.

Figure 14:
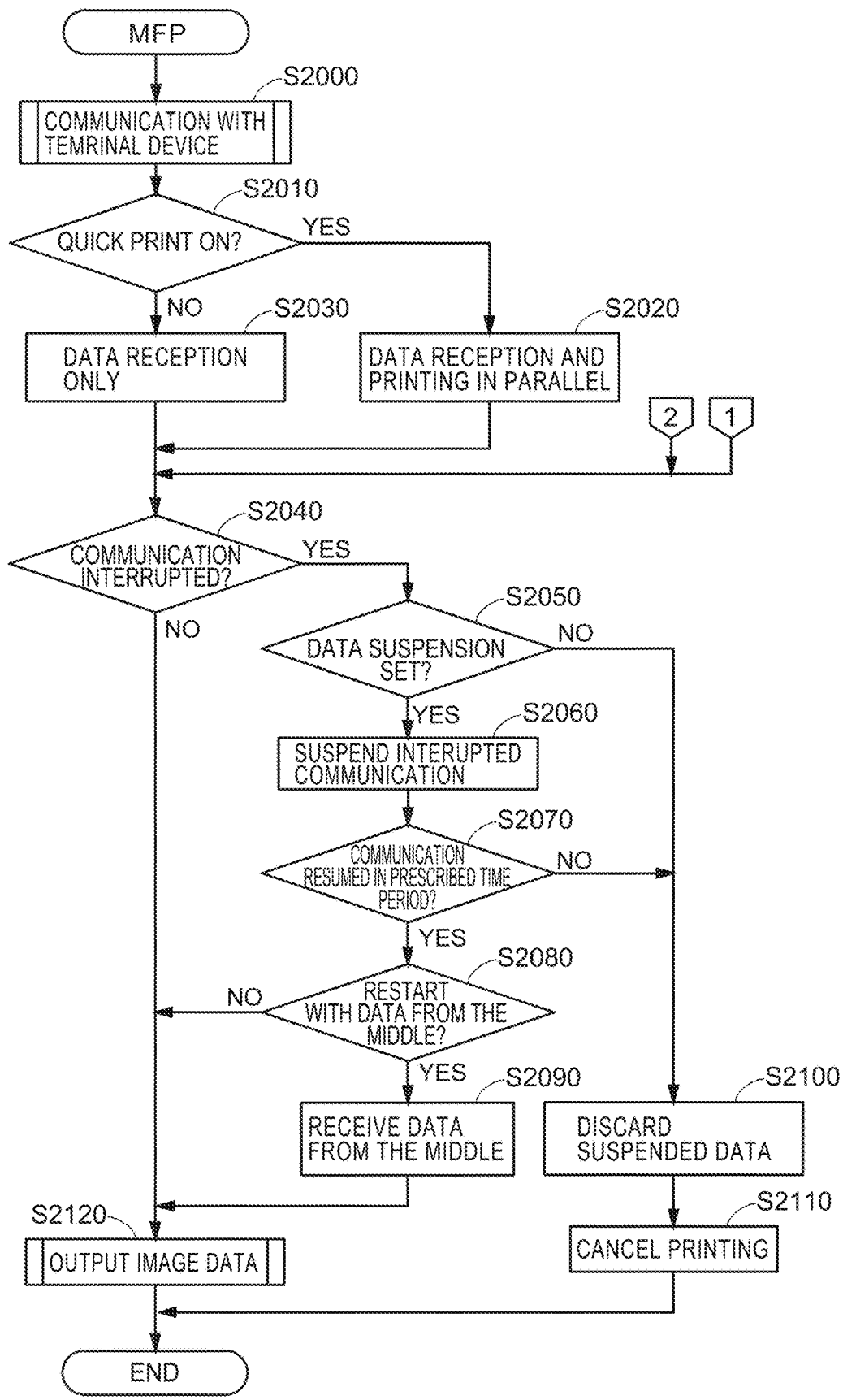
FIG. 14 is a flowchart representing a control structure of a program executed by the multifunction peripheral shown in FIG. 1.

Referring to FIG. 14, a control structure of a computer program executed by MFP 100 in image forming system 50 in accordance with the present embodiment will be described. The program is activated when MFP 100 is powered on.

The program includes: a step S2000 of executing a communication process with terminal device 200; a step S2010, executed after step S2000, of determining whether the quick print function is ON, and branching the flow of control depending on the result of determination; a step S2020, executed if it is determined at step S2010 that the quick print function is ON, of printing while receiving the image data; a step S2030, executed if it is determined at step S2010 that the quick print function is not ON, of only receiving the image data; and a step S2040, executed after steps S2020 and S2030 of determining whether communication with terminal device 200 is interrupted, and branching the flow of control depending on the result of determination.

The program further includes: a step S2050, executed if it is determined at step S2040 that the communication is interrupted, of determining whether data suspension is set (whether the setting is to suspend data that is being transmitted), and branching the flow of control depending on the result of determination; a step S2060, executed if it is determined at step S2050 that the data suspension is set, of executing a process of suspending the unfinished state of communication (suspending the data that is being transmitted); a step S2070, executed after step S2060, of determining whether or not communication is resumed within a prescribed time period from interruption, and branching the flow of control depending on the result of determination; and a step S2080, executed if it is determined at step S2070 that the communication is resumed within the prescribed time period, of determining whether or not the operation is to be restarted with the interrupted data, and branching the flow of control depending on the result of determination.

At step S2050, whether the setting is to suspend the data is determined based on which of the check boxes 410 and 420 is checked on wireless setting screen 400 shown in FIG. 6. If check box 410 is checked, control unit 110 determines that the setting is to suspend the data. If check box 420 is checked, control unit 110 determines that data suspension is not set.

The program further includes: a step S2090, executed if it is determined at step S2080 that the communication is to be resumed with the interrupted data, of receiving the image data from the middle (from the position where transmission stopped last time); a step S2100, executed if it is determined at step S2050 that the data suspension is not set, and if it is determined at step S2070 that the communication is not resumed within the prescribed time period, of discarding the suspended image data; a step S2110, executed after step S2100, of cancelling printing and ending the program; and a step S2120, executed if it is determined at step S2040 that the communication is not interrupted, if it is determined at step S2080 that the communication is not to be restarted with the interrupted data, and after step S2090, of executing a process of outputting image data and ending the program.

Figure 15:
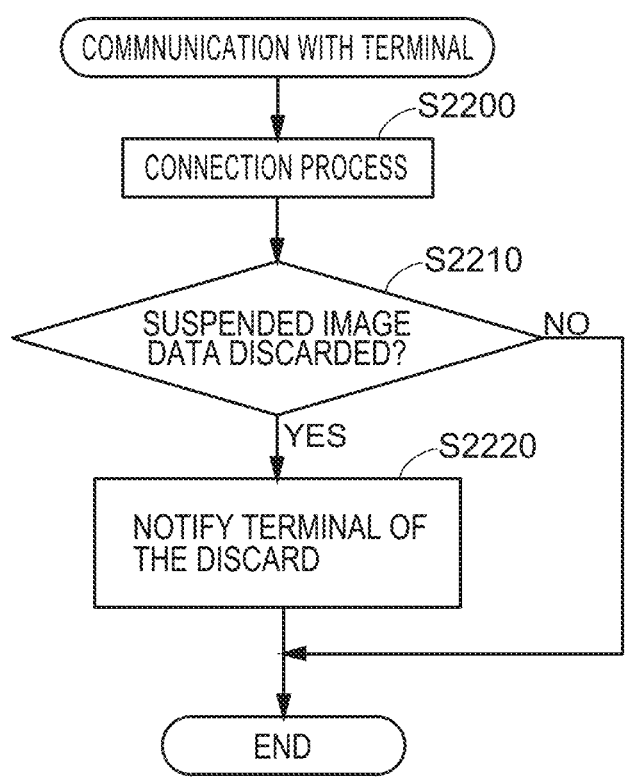
FIG. 15 shows a detailed flow of step S2000 of FIG. 14.

FIG. 15 is a detailed flow of step S2000 of FIG. 14. Referring to FIG. 15, the routine includes; a step S2200 of executing a process of connecting to terminal device 200 through wireless link 300; a step S2210, executed after step S2200, of determining whether or not the suspended image data is discarded, and branching the flow of control depending on the result of determination; and a step S2220, executed if it is determined at step S2210 that the suspended image data is discarded, of notifying terminal device 200 of the discard and ending the routine. The routine also ends if it is determined at step S2210 that the suspended image data is not discarded.

Figure 16:
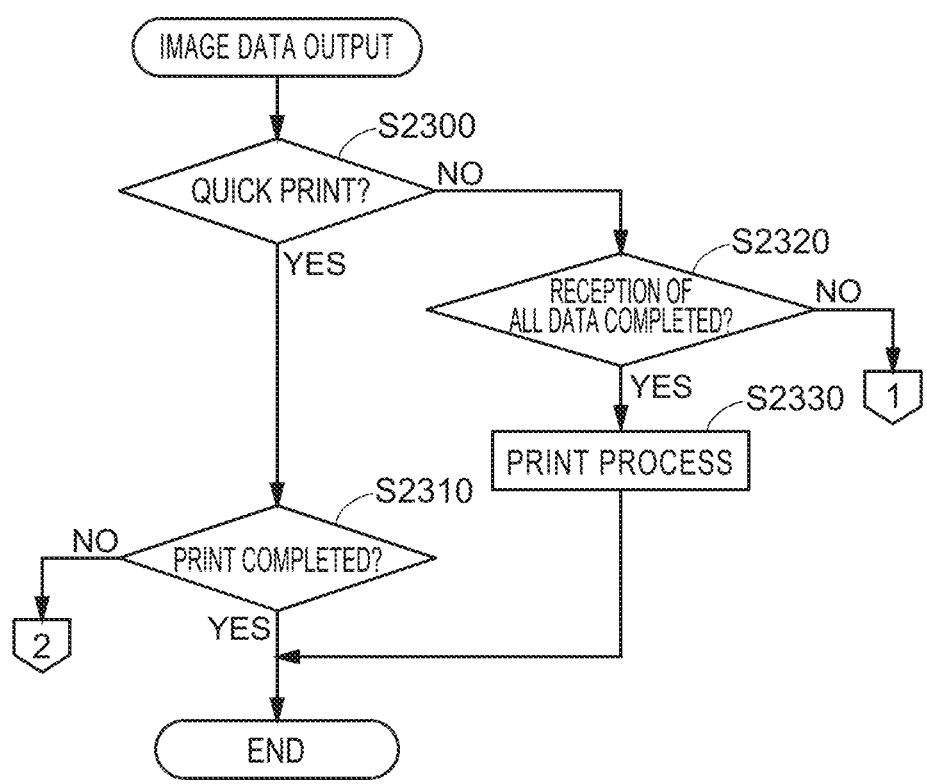
FIG. 16 shows a detailed flow of step S2120 of FIG. 14.

FIG. 16 is a detailed flow of step S2120 of FIG. 14. Referring to FIG. 16, the routine includes: a step S2300 of determining whether the quick print is set (ON), and branching the flow of control depending on the result of determination; a step S2310, executed if it is determined at step S2300 that the quick print is set, of determining whether printing is completed, and branching the flow of control depending on the result of determination; a step S2320, executed if it is determined at step S2300 that the quick print is not set, of determining whether reception of all data is completed, and branching the flow of control depending on the result of determination; and a step S2330, executed if it is determined at step S2320 that reception of all data is completed, of executing the print process based on the received image data and ending the routine.

If it is determined at step S2310 that printing is completed, the routine ends. On the other hand, if it is determined at step S2310 that printing is not yet completed, the control returns to step S2040 shown in FIG. 14. Similarly, the control returns to step S2320 shown in FIG. 14, if it is determined at step S2320 that reception of all data is not yet completed.

[Operation]

Referring to FIGS. 1 to 3 and 8 to 16, the operation of image forming system 50 in accordance with the present embodiment based on the structures and flowcharts as above will be described.

Referring to FIG. 1, a user of terminal device 200 operates terminal device 200 to execute printing on MFP 100. Terminal device 200 communicates in wireless manner with MFP 100, and establishes connection with MFP 100 through wireless link 300. When the user selects an image data, terminal device 200 issues a print request. Terminal device 200 determines whether or not radio wave intensity is sufficiently high, and if the radio intensity is sufficiently high (YES at step S1020 shown in FIG. 8), transmits the selected image data to MFP 100 (step S1030). Terminal device 200 continues sending image data until transmission of all data is completed.

If MFP 100 is set to do quick printing (YES at step S2010 shown in FIG. 14), MFP 100 prints while receiving the image data from terminal device 200 (step S2020). When reception of all data transmitted from terminal device 200 is completed and printing ends (YES at step S2310 shown in FIG. 16), the operation of image forming system 50 ends. If quick printing is not set (NO at step S2010 shown in FIG. 14), only the reception of image data takes place (step S2030), and when reception of all data is completed (YES at step S2320 shown in FIG. 16), the print process is executed (step S2330). When the print process ends, the operation of image forming system 50 ends.

Referring to FIG. 2, if radio wave intensity decreases during transmission of image data from terminal device 200 to MFP 100 (NO at step S1020 shown in FIG. 8) and the communication is about to be lost (NO at step S1100), terminal device 200 determines whether or not the alarm display setting is ON (step S1110). If the alarm display setting is ON (YES at step S1110), terminal device 200 displays the dialogue 620 shown in FIG. 12 on user I/F 230, and thereby notifies the user of the bad radio wave condition (step S1120). In this situation, terminal device 200 continues transmission of image data (step S1030). If the user recognizes the bad condition of radio wave by this notification (alarm) and moves closer to MFP 100, the radio wave condition will be improved. If the alarm display setting is not ON (NO at step S1110), terminal device 200 continues transmission of image data without displaying the dialogue 620 on user I/F 230 (step S1030).

Referring to FIG. 3, if the communication is interrupted while image data is being transmitted from terminal device 200 to MFP 100 (YES at step S1100 shown in FIG. 8), terminal device 200 displays the dialogue 630 shown in FIG. 13 on user I/F 230, to have the user select whether the unfinished state is to be suspended. When the user operates "YES" key 632 on dialogue 630, terminal device 200 determines that the unfinished state is to be suspended, and executes the suspending process (step S1140 shown in FIG. 8). Specifically, terminal device 200 stores the stop position when transmission of image data is stopped as the communication is interrupted. When the user operates "NO" key 634, terminal device 200 determines that the unfinished state is not to be suspended, and ends the operation of transmitting the image data.

That the communication is interrupted on the side of terminal device 200 also means that the communication is interrupted on the side of MFP 100. If an interruption of communication with terminal device 200 is detected (YES at step S2040 shown in FIG. 14), MFP 100 determines whether it is set to suspend data (step S2050), and if it is set to suspend data, it suspends the unfinished state of communication (step S2060). When a communication is interrupted, MFP 100 starts counting of elapsed time from the interruption.

Assume that after the communication was interrupted during transmission of image data, the user of terminal device 200 tries to transmit the image data again, within a prescribed time period from the interruption of communication. If the communication is resumed within the prescribed time period (YES at step S2070 shown in FIG. 14), the suspended image data is not yet discarded, as will be described later.

When terminal device 200 communicates with MFP 100 again (step S1000 shown in FIG. 8), terminal device 200 determines that the data suspended last time remains in terminal device 200 (YES at step S1010). Terminal device 200 displays dialogue 610 shown in FIG. 11 on user I/F 230, to have the user select whether the image data is to be transmitted from the middle. If the user operates "YES" key 612 on dialogue 610, terminal device 200 determines that the image data is to be transmitted from the middle (YES at step S1070). Then, terminal device 200 transmits an instruction to MFP 100 that the image data will be transmitted from the middle (from the position interrupted last time) (step S1080). Thereafter, terminal device 200 changes the settings of itself to enable transmission of image data from the middle (step S1090), and thus, transmits the image data from the middle.

Upon reception of the instruction from terminal device 200, MFP 100 determines that the communication will be resumed with the data from the middle (YES at step S2080 shown in FIG. 14), and receives the image data from the middle (from the position interrupted last time) (step S2090). If quick print is set in MFP 100 (YES at step S2300 shown in FIG. 16), printing is done while image data is being received. When printing ends (YES at step S2310), the operation of image forming system 50 ends. If the quick print is not set in MFP 100 (NO at step S2300 shown in FIG. 16), then, after reception of all data including the image data suspended last time is completed (YES at S2320), the process for printing the received image data is executed (step S2330). When printing ends, the operation of image forming system 50 ends.

On the other hand, if the user operates "NO" key 614 on dialogue 610 shown in FIG. 11, terminal device 200 determines that the image data is not to be transmitted from the middle (image data is to be transmitted from the start) (NO at step S1070 shown in FIG. 8). Here, the setting is not changed to transmit the image data from the middle and, hence, terminal device 200 transmits the image data from the start (step S1030). MFP 100 determines that the communication is not resumed with the interrupted data (NO at step S2080 shown in FIG. 14), and receives the image data from the start. After receiving the image data, MFP 100 executes the print process based on the image data.

In order to prevent data representing unfinished state of communication from being continuously accumulated in terminal device 200 because of the suspending process (step S1140), terminal device 200 deletes data after a prescribed time period from the start time of the corresponding job.

On the other hand, if terminal device 200 does not transmit the image data within the prescribed time period after the interruption of communication (NO at step S2070 shown in FIG. 14), MFP 100 discards the image data that has been suspended (step S2100), and cancels printing (step S2110).

Assume that the user of terminal device 200 tries to transmit the same image data, after the lapse of the prescribed time period from the interruption of communication. Here, when connected to terminal device 200, MFP 100 notifies terminal device 200 of the fact that the image data has been discarded (step S2220 shown in FIG. 15). Receiving the notification that the image data has been discarded (YES at step S1210 shown in FIG. 9), terminal device 200 stores the fact that the image data that had been suspended in MFP 100 is discarded (step S1220).

Even though the data suspended last time remains in terminal device 200 (YES at step S1010 shown in FIG. 8), if the image data that had been suspended in MFP 100 is discarded (YES at step S1050), terminal device 200 displays dialogue 600 shown in FIG. 10 on user I/F 230 to notify the user that the image data is to be transmitted from the start (printing is to be done anew), since the image data that had been suspended in MFP 100 is discarded. Thereafter, terminal device 200 deletes the data suspended last time, from terminal device 200.

If the image data that had been suspended in MFP 100 is discarded, it is impossible to resume communication with the interrupted data. In this situation, the data suspended last time still remains in terminal device 200 and, hence, it may be possible that the user of terminal device 200 erroneously assumes that the image data up to the point of interruption is still kept in MFP 100, and requests MFP 100 to restart with the interrupted data.

In the present embodiment, the user is notified of the discard of image data that had been suspended in MFP 100 and, therefore, the user becomes aware that restart with the interrupted data is impossible. Thus, the problem mentioned above possibly caused by misrecognition can be prevented.

[Effects of the Present Embodiment]

As is apparent from the description above, use of image forming system 50 in accordance with the present embodiment attains the following effects.

The present image forming system 50 detects whether or not communication between MFP 100 and terminal device 200 is interrupted. If interruption of communication is detected while image data is being transmitted from terminal device 200 to MFP 100, the present image forming system 50 suspends the unfinished state of communication interrupted halfway through. Specifically, in the present image forming system 50, when the communication is interrupted, the unfinished state of communication (the state at the time point when communication is interrupted) is recorded. Therefore, when the communication resumes (recovers), data transfer can be restarted from the middle and, therefore, time and labor for restart can be saved.

Assume that image data is being transmitted from terminal device 200 to MFP 100 and the user using terminal device 200 moves out of the range of wireless communication while holding terminal device 200. Then, the communication is interrupted. In such a situation, the unfinished state of communication is suspended in the present image forming system 50. Therefore, when the user moves back to the range allowing wireless communication and the communication resumes, data communication can be restarted from the middle. Thus, time and labor at the time of restart can efficiently be saved.

Further, assume that image data of large data size is to be transmitted from terminal device 200 to MFP 100 through wireless link 300. In a conventional system, the user using terminal device 200 cannot go out of the range of wireless communication and if he/she should go out of the range of wireless communication and the communication is interrupted, data communication must be done again from the start. In contrast, in the present image forming system 50, even when the user goes out of the range allowing wireless communication and the communication is interrupted, data communication can be restarted from the middle and, therefore, the user can move freely with terminal device 200.

Further, when the radio wave condition of wireless link 300 deteriorates, for example, terminal device 200 notifies the user of the bad radio wave condition as an alarm related to the state of wireless link. By this notification, the user becomes aware of the state of wireless link 300 (that the radio wave condition is bad). Thus, by urging the user to move to a range of better radio wave condition, for example, it is possible to attain better radio wave condition.

Further, if it is detected that communication is interrupted while image data is being transmitted from terminal device 200 to MFP 100, terminal device 200 displays dialogue 630 on user I/F 230 to ask the user if the unfinished state of communication is to be suspended. Therefore, it is possible for the user to select whether the unfinished state of communication is to be suspended or not. The unfinished state of communication can be suspended only when the user so wishes.

In the present image forming system 50, if interruption of communication is detected while image data is being transmitted from terminal device 200 to MFP 100, both terminal device 200 and MFP 100 suspend the unfinished state of communication. Since terminal device 200 suspends the unfinished state of transmission of image data halfway through, it is possible for terminal device 200 to easily transmit the image data from the middle when the communication is resumed. Further, since MFP 100 suspends the unfinished state of reception of image data halfway through, it is possible for MFP 100 to easily receive the image data from the middle when the communication is resumed.

MFP 100 measures the lapsed time after the detection of interruption of communication. If the communication resumes within a prescribed time period from the detection of interruption of communication, MFP 100 receives the image data from the suspended, unfinished state of communication. If the communication does not resume within the prescribed time period after the detection of interruption of communication, MFP 100 discards the received image data. It is likely that data transmission is resumed, if it is within a prescribed time period from when interruption of communication is detected. Therefore, MFP 100 is configured to be able to receive image data from the suspended unfinished state of communication, if the communication restarts within a prescribed time period from the detection of interruption of communication. On the other hand, if the prescribed time period passed from when interruption of communication was detected, it is unlikely that the data transmission restarts, or it is more likely that the data transmission is started anew. Therefore, MFP 100 discards the received image data if communication is not resumed within a prescribed time period from when the link state detecting means detected the interruption of communication. Thus, wasteful use of storage area for storing image data can be avoided.

MFP 100 has the print function of starting image formation (printing) after reception of image data is completed. If this print function is selected, MFP 100 does not start printing until all data are received. Therefore, even when communication is interrupted during transfer of the image data and the data communication is restarted from the middle when the communication resumes, it is possible to prevent the sheets of print outputs dispersed (separated). This also saves time and labor at the time of restart.

[Modifications]

Though an example in which the present invention is applied to an MFP as one type of image forming apparatus has been described in the embodiment above, the present invention is not limited to such an embodiment. The image forming apparatus constituting the present image forming system may be an apparatus other than the MFP. By way of example, it may be a printing device having only the printing function.

Though an example in which the present invention is applied to a smart phone as a terminal device has been described in the embodiment above, the present invention is not limited to such an embodiment. The terminal device constituting the present image forming system may be any terminal device other than the smart phone provided that it is capable of transmitting image data to the image forming apparatus. The terminal devices other than the smart phone may include, for example, a portable telephone, a PDA (Personal Digital Assistant), a note-book type personal computer (hereinafter referred to as "PC"), an unportable PC (such as a desk-top PC), a tablet terminal and the like.

Though an example in which the terminal device and the MFP are connected to enable communication via wireless link has been described in the embodiment above, the present invention is not limited to such an embodiment. By way of example, the terminal device and the image forming apparatus may be connected to enable communication via wired communication link. Even when these are connected in wired manner, communication may be interrupted by some cause or other. Even in such a case, the time and labor can be saved at the restart of communication by applying the present invention.

Though an example in which the unfinished state of communication is suspended both by the terminal device and the MFP when communication is interrupted has been described in the embodiment above, the present invention is not limited to such an embodiment. By way of example, when the communication is interrupted, the unfinished state of communication may be suspended only by the MFP. In that case, the MFP may store the terminal information of the terminal device as the source of transmission of image data and information related to the suspension, and the MFP may notify the terminal device of the information of suspension at the time of next communication (connection), so as to allow the user to select whether the suspended printing is to be restarted or not.

Though an example in which the setting as to whether the unfinished state of communication is to be suspended or not in the MFP is done on the side of the MFP has been described in the embodiment above, the present invention is not limited to such an embodiment. The setting as to whether the unfinished state of communication is to be suspended or not in the MFP may be done on the side of the terminal device, or may be done both by the terminal device and the MFP. If the setting is on the side of the terminal device, for example, a piece of information as to whether suspension is to be done or not is sent from the terminal device to the MFP at the first communication (connection) with the MFP. Receiving this notification from the terminal device, the MFP operates as notified.

Figure 17:
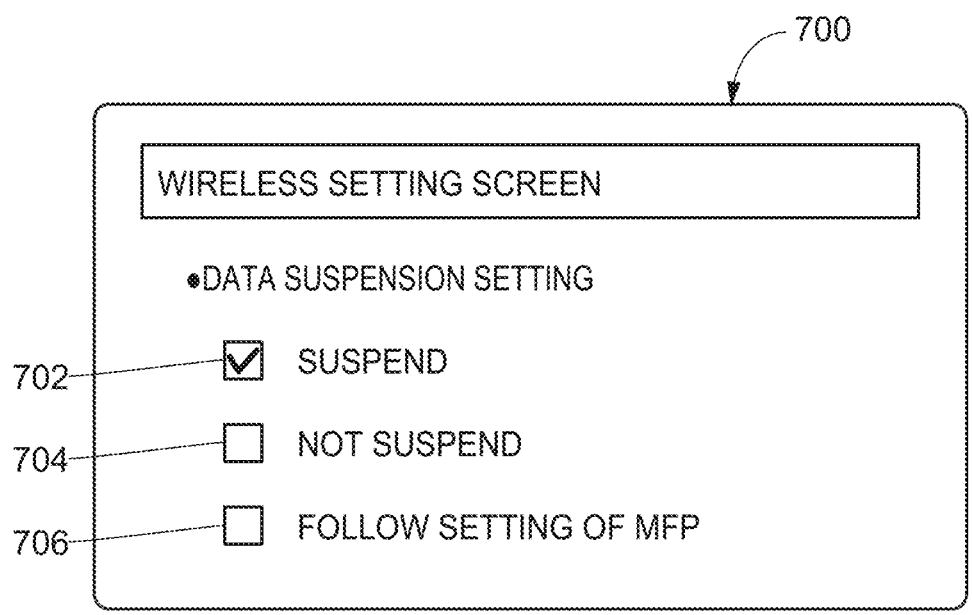
FIG. 17 shows an example of a screen image allowing wireless settings displayed on a terminal device in accordance with a modification of the present invention.
Figure 18:
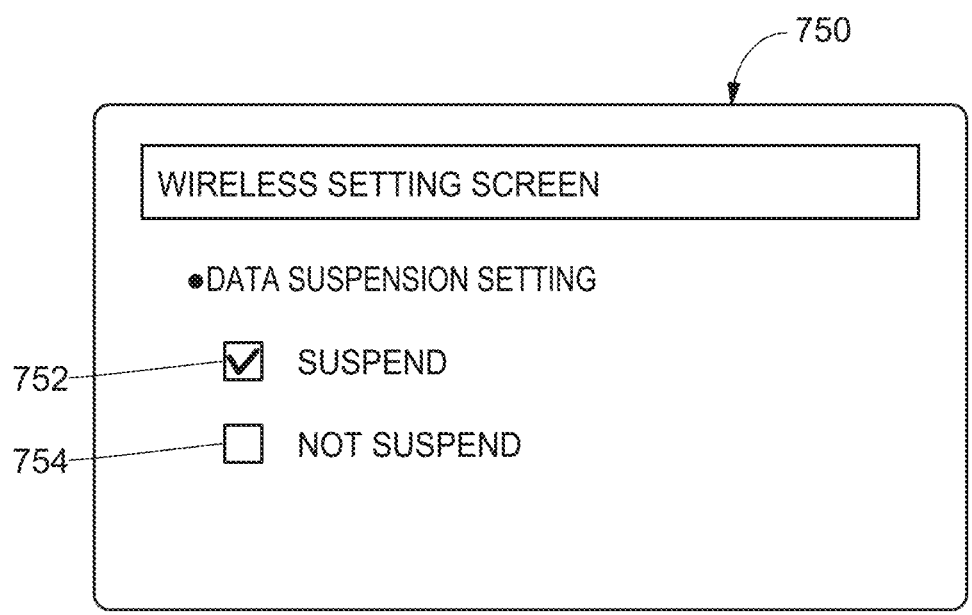
FIG. 18 shows an example of a screen image allowing wireless settings displayed on a multifunction peripheral in accordance with a modification of the present invention.

When the setting as to whether the unfinished state of communication is to be suspended or not in the MFP is to be done both by the terminal device and the MFP, a wireless setting screen is displayed in each of these. Referring to FIG. 17, a wireless setting screen 700 is displayed on the user I/F of the terminal device. Wireless setting screen 700 includes a check box 702 to be checked when the data of unfinished communication is to be suspended, a check box 704 to be checked when the data of unfinished communication is not to be suspended, and a check box 706 to be checked when the setting on the side of MFP is to be followed. Referring to FIG. 18, a wireless setting screen 750 is displayed on an operation unit (display panel) of the MFP. Wireless setting screen 750 includes a check box 752 to be checked when the data of unfinished communication is to be suspended, and a check box 754 to be checked when the data of unfinished communication is not to be suspended. If the setting on the MFP is different from that on the terminal device, the setting on the MFP may be given priority, or the setting on the terminal device may be given priority.

Though an example in which the setting as to whether the alarm display is to be given on the terminal device when the radio wave intensity is low is done on the side of the terminal device has been described in the embodiment above, the present invention is not limited to such an embodiment. The setting as to whether the alarm display is to be given on the terminal device may be done on the side of MFP (image forming apparatus) or may be done both by the MFP and the terminal device. If the setting is to be done on the side of MFP, for example, a piece of information as to whether the alarm display is to be given is sent from the MFP to the terminal device at the first communication (connection) with the terminal device. Receiving this notification from the MFP, the terminal device operates as notified.

Figure 19:
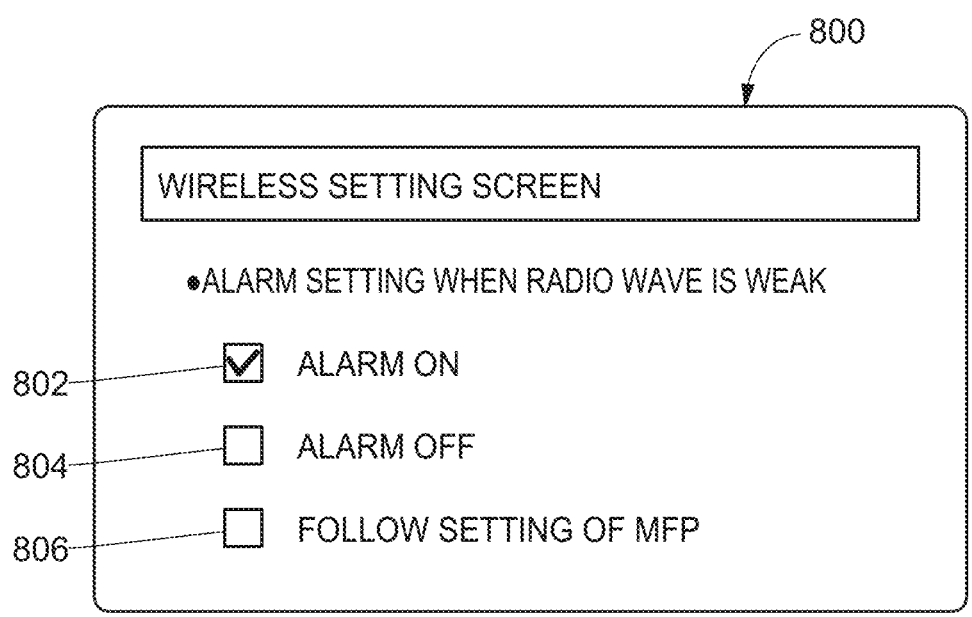
FIG. 19 shows an example of a screen image allowing wireless settings displayed on a terminal device in accordance with another modification of the present invention.
Figure 20:
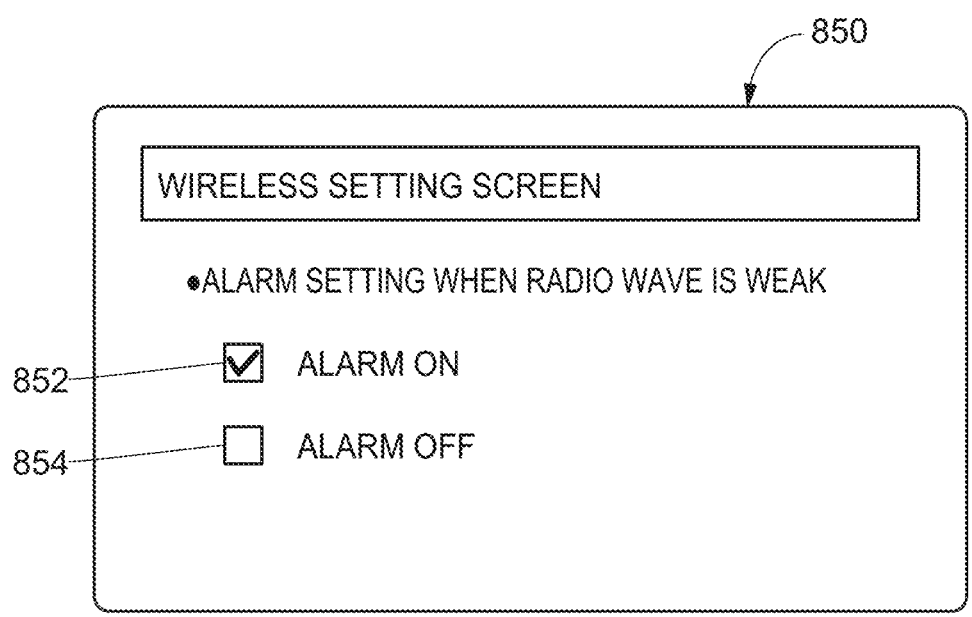
FIG. 20 shows an example of a screen image allowing wireless settings displayed on a multifunction peripheral in accordance with another modification of the present invention.

If the setting as to whether the alarm display is to be given is to be done both by the terminal device and the MFP, a wireless setting screen is displayed in each of these. Referring to FIG. 19, a wireless setting screen 800 is displayed on the user I/F of the terminal device. Wireless setting screen 800 includes, as the setting for alarm when the radio wave intensity is low, a check box 802 to be checked when the alarm is to be given, a check box 804 to be checked when the alarm is not to be given and a check box 806 to be checked when the setting on the side of MFP is to be followed. Referring to FIG. 20, a wireless setting screen 850 is displayed on operation unit (display panel) of the MFP. Wireless setting screen 850 includes, as the setting for alarm when the radio wave intensity is low, a check box 852 to be checked when the alarm is to be given, and a check box 854 to be checked when the alarm is not to be given. If the setting on the MFP is different from that on the terminal device, the setting on the MFP may be given priority, or the setting on the terminal device may be given priority.

Though an example in which a dialogue is displayed on the terminal device to notify the user of bad radio wave condition when the radio wave condition of wireless link deteriorates has been described in the embodiment above, the notification to the user may utilize at least one of alarm sound and vibration, in addition to the display of dialogue.

In the embodiment above, the image forming system may be linked to cloud. By way of example, the MFP may be connected to a server on a network to enable communication, and the suspended data in the MFP may be transferred to the cloud (server) if the data is not used after a prescribed time period. When the terminal device transmits the image data from the middle, the terminal device may notify not the MFP but the server of the fact that transmission will be restarted from the interrupted data. In this manner, by saving the suspended data in a server on a network, the burden on the HDD (storage) of the MFP can be alleviated. Further, by saving the suspended data on a server on a network, it becomes possible to restart printing from the middle by a different MFP.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

By the present invention, an image forming apparatus and the like that can save time and labor at the time of restarting communication, even when communication is interrupted during transfer of image data, can be provided.

REFERENCE SIGNS LIST 50 image forming system
100 MFP
110 control unit
120 image reading unit
130 image processing unit
140 image forming unit
150, 240 wireless communication unit
160 operation unit
200 terminal device
210 control unit
220 storage device
230 user I/F
300 wireless link
400, 500 wireless setting screen
600~630 dialogue

The invention claimed is:

1. An image forming apparatus, connected to a terminal device through a communication link including a wireless link, receiving image data transmitted from the terminal device and forming an image based on the image data, the image forming apparatus comprising:
   a wireless communicator that communicates with the terminal device through the wireless link;
   a link state detector that detects a state of the wireless link; and
   a notifier for setting the terminal device to notify a user of information related to decrease of radio wave intensity, when the radio wave intensity of the wireless link becomes equal to or lower than a prescribed threshold value.

2. The image forming apparatus according to claim 1, wherein said notifier sets the terminal device to notify the user of the information before the communication link with said terminal device is interrupted.

3. The image forming apparatus according to claim 1, wherein the wireless communicator receives image data transmitted from the terminal device even when the terminal device is notifying the user of the information related to decrease of radio wave intensity as the radio wave intensity of the wireless link becomes equal to or lower than the prescribed threshold value while the wireless communicator is receiving the image data transmitted from the terminal device.

4. The image forming apparatus according to claim 1, wherein the image forming apparatus further includes a controller, responsive to detection by the link state detector of an interruption of communication during the reception of the image data transmitted from the terminal device is being received, that suspends the reception and records an unfinished state of the reception of the image data; and
   the wireless communicator resumes reception of the image data from a position where communication has been interrupted of the image data that was being received, based on the state recorded in said controller, in accordance with detection by said link state detector.

5. The image forming apparatus according to claim 4, further comprising:
   a timer that measures time elapsed after the detection of the interruption of communication by the link state detector; and
   a receiver that receives, when the image forming apparatus is suspending an unfinished state of communication and communication is resumed within a prescribed time period from the detection of the interruption of communication by the link state detector, the image data from the suspended unfinished state; wherein
   the image forming apparatus discards the image data received, when the image forming apparatus is suspending an unfinished state of communication and communication is not resumed within a prescribed time period from the detection of the interruption of communication by the link state detector.

6. The image forming apparatus according to claim 4, wherein the image forming apparatus starts image formation after the reception of image data is completed.

7. A terminal device, connected to an image forming apparatus through a wireless link, the terminal device comprising:
   a transmitter that transmits image data to the image forming apparatus; and
   a link state detector that detects a state of the wireless link; wherein
   the terminal device detects the state of the wireless link and determines whether radio wave intensity of the state of the link detected is equal to or lower than a prescribed threshold value;

the terminal device, in response to the radio wave intensity of the detected state of the link being equal to or lower than a prescribed threshold value, notifies a user of information related to decrease of radio wave intensity, before connection to said terminal device is interrupted.

8. The terminal device according to claim 7, wherein said terminal device notifies the user that the radio wave intensity is insufficient as said information related to decrease of radio wave intensity.

9. The terminal device according to claim 7, wherein said terminal device notifies the user of a method of improving radio wave intensity as said information related to decrease of radio wave intensity.

10. The terminal device according to claim 7, wherein the transmitter transmits image data to the image forming apparatus even when the information related to decrease of radio wave intensity is being notified as the radio wave intensity of the wireless link becomes equal to or lower than the prescribed threshold value while the image data is being transmitted to said image forming apparatus.

11. The terminal device according to claim 7, further comprising
an inquirer, responsive to detection by the link state detector of an interruption of communication with said image forming apparatus, that makes an inquiry as to whether or not an unfinished state of transmission of said image data is to be recorded;
a display that displays the inquiry in response to an instruction from the inquirer; and
a controller that selectively executes, in response to an instruction input to the inquiry displayed on the display, a process of suspending or a process of not suspending communication.

12. An image forming system, including a terminal device transmitting image data, and an image forming apparatus connected to the terminal device through a communication link including a wireless link, receiving the image data transmitted from the terminal device and forming an image based on the image data, the image forming system comprising:
a link state detector that detects a state of the wireless link; wherein
each of the terminal device and the image forming apparatus includes wireless communicators that communicate with each other through the wireless link;
the terminal device detects the state of the wireless link and determines whether radio wave intensity of the state of the wireless link detected is equal to or lower than a prescribed threshold value;
the terminal device notifies a user of information related to decrease of radio wave intensity when the radio wave intensity of the wireless link becomes equal to or lower than the prescribed threshold value; and
the image forming apparatus further includes a setting screen that is used to set the terminal device to notify the user of said information when the radio wave intensity of the wireless link becomes equal or lower than the prescribed threshold value, in accordance with an operation input by the user through the setting screen.

13. The image forming system according to claim 12, wherein said information related to decrease of the radio wave intensity includes insufficient radio wave intensity.

14. The image forming system according to claim 12, wherein said terminal device notifies the user of said information related to decrease of the radio wave intensity before connection to said terminal device is interrupted.

15. The image forming system according to claim 12, wherein the wireless communicator conducts transmission of image data from the terminal device and reception of image data from the image forming apparatus, even when the terminal device is notifying the user of said information when the radio wave intensity of the wireless link becomes equal to or lower than the prescribed threshold value while the image data is being transmitted and received between the image forming apparatus and the terminal device.

16. The image forming system according to claim 12, wherein the image forming apparatus suspends an unfinished state of receiving the image data.

17. The image forming system according to claim 12, wherein the image forming apparatus suspends an unfinished state of receiving the image data, and the terminal device suspends an unfinished state of transmitting the image data.

* * * * *